United States Patent
Peisert et al.

[11] Patent Number: 5,868,208
[45] Date of Patent: Feb. 9, 1999

[54] POWER TOOL

[76] Inventors: Andreas Peisert, Lortzingstrasse 14, D-70195 Stuttgart; Wolfgang Kofink, Krokusweg 16, D-89522 Heidenheim; Michael Nothofer, Gustav-Hertz-Strasse 9, D-70806 Kornwestheim; Manfred Ludwig, Lindpaintnerstrasse 83, D-70195 Stuttgart, all of Germany

[21] Appl. No.: 671,688

[22] Filed: Jun. 28, 1996

[30] Foreign Application Priority Data

Dec. 29, 1993 [DE] Germany ............ 43 44 849.6

[51] Int. Cl.$^6$ .................. B25B 23/157; B25D 16/00
[52] U.S. Cl. .................. 173/178; 173/110; 173/122; 173/48
[58] Field of Search ............. 173/48, 49, 109, 173/110, 111, 122, 124, 205, 216, 117, 178, 176

[56] References Cited

U.S. PATENT DOCUMENTS

| | | | |
|---|---|---|---|
| 1,921,628 | 8/1933 | Maxwell et al. ............ | 173/110 |
| 2,392,097 | 1/1946 | Meunier . | |
| 2,764,138 | 9/1956 | Wahlsten et al. ............ | 173/122 |
| 2,825,436 | 3/1958 | Amtsberg . | |
| 3,463,246 | 8/1969 | Bronnert ............ | 173/110 |
| 3,650,336 | 3/1972 | Koehler ............ | 173/110 |
| 3,847,229 | 11/1974 | Wanner et al. ............ | 173/122 |
| 4,019,589 | 4/1977 | Wallace . | |
| 4,591,299 | 5/1986 | Eckman . | |
| 4,799,833 | 1/1989 | Pennison et al. . | |
| 5,201,373 | 4/1993 | Bloechle ............ | 173/109 |
| 5,277,259 | 1/1994 | Schmid et al. ............ | 173/109 |
| 5,346,023 | 9/1994 | Takagi et al. ............ | 173/109 |

FOREIGN PATENT DOCUMENTS

| | | |
|---|---|---|
| 01 82 986 | 6/1986 | European Pat. Off. . |
| 2 039 369 | 2/1971 | Germany . |
| 23 28 826 | 1/1975 | Germany . |
| 81 02 453 | 10/1982 | Germany . |
| 33 29 010 | 2/1985 | Germany . |
| 36 21 182 | 1/1988 | Germany . |
| 37 10 149 | 8/1988 | Germany . |
| 37 40 083 | 6/1989 | Germany . |
| 89 04 356 | 7/1989 | Germany . |
| 38 40 974 | 6/1990 | Germany . |
| 39 40 743 | 6/1991 | Germany . |
| 41 02 200 | 10/1991 | Germany . |
| 41 23 349 | 3/1993 | Germany . |
| 49-39174 | 8/1972 | Japan . |
| 50-97808 | 12/1973 | Japan . |
| 52-68643 | 12/1976 | Japan . |
| 61-131876 | 6/1986 | Japan . |
| 63-143074 | 9/1988 | Japan . |

Primary Examiner—Scott A. Smith

[57] ABSTRACT

A power tool has a drive mechanism with an output shaft which performs an intermittent rotary motion. The output shaft drives, via an overrunning clutch, a tool drive shaft to drive a tool, which thus performs a quasi-continuous rotary motion that, as the load on the machine increases, transitions increasingly into a discontinuous rotary motion. The power tool can advantageously be used as a hand-held power tool for screwing, drilling, sawing, sanding, and the like, a high output torque with a low reaction torque being achievable as a result of the intermittent drive mechanism.

36 Claims, 12 Drawing Sheets

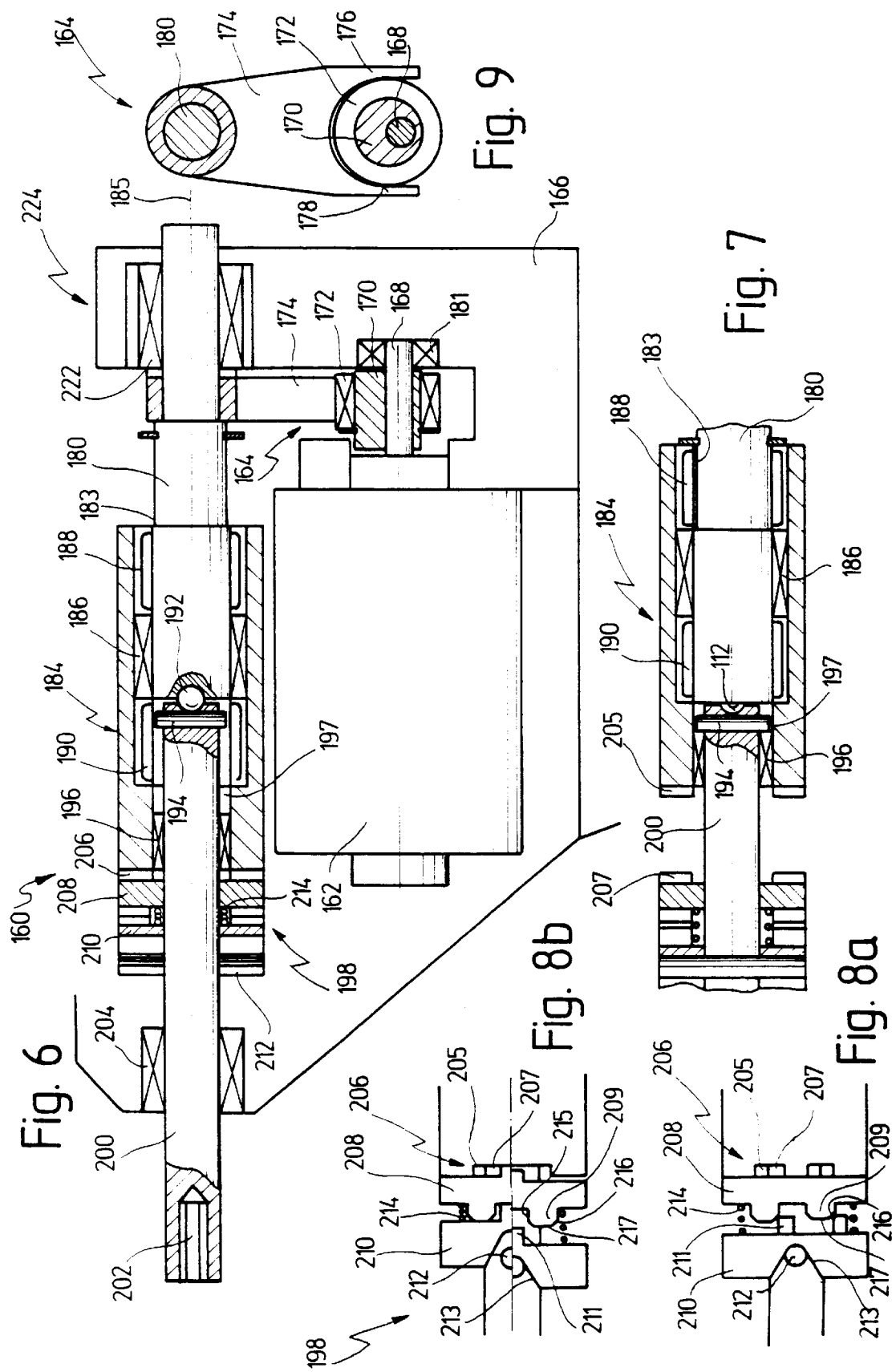

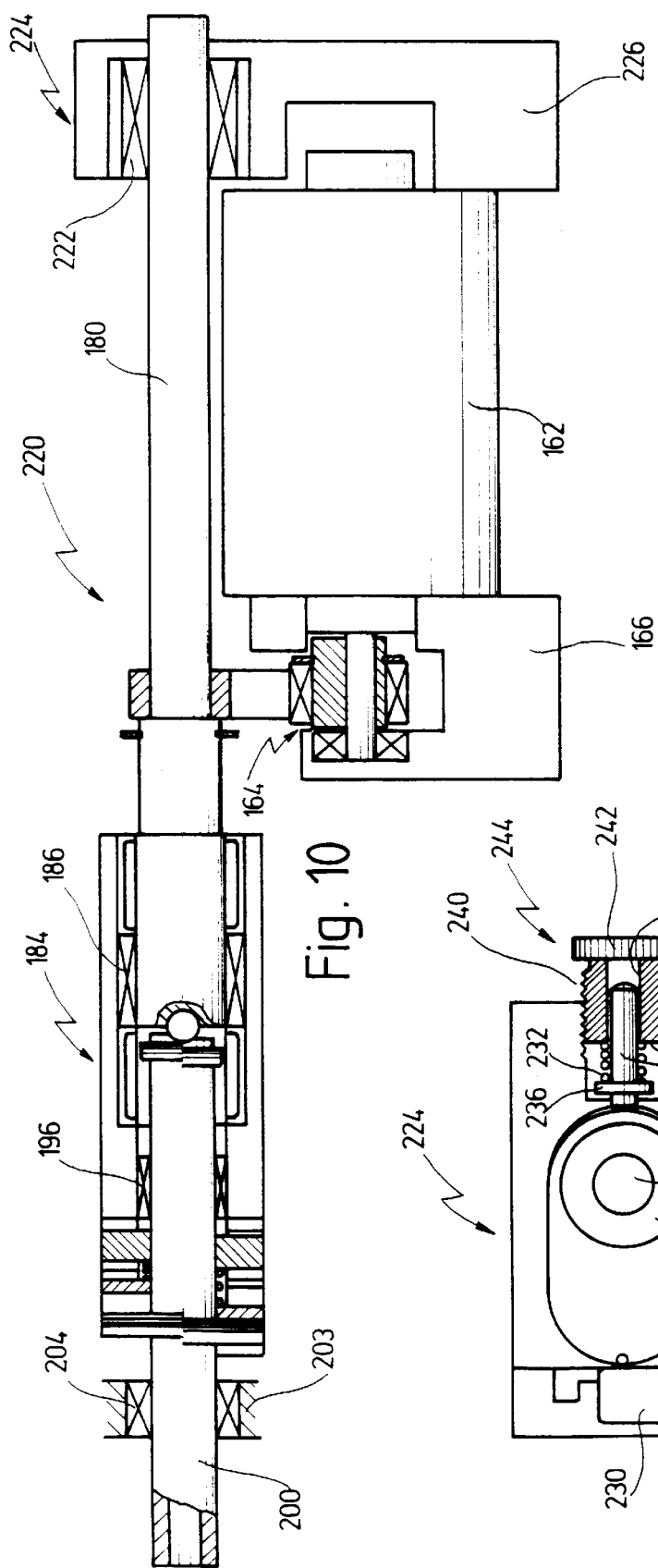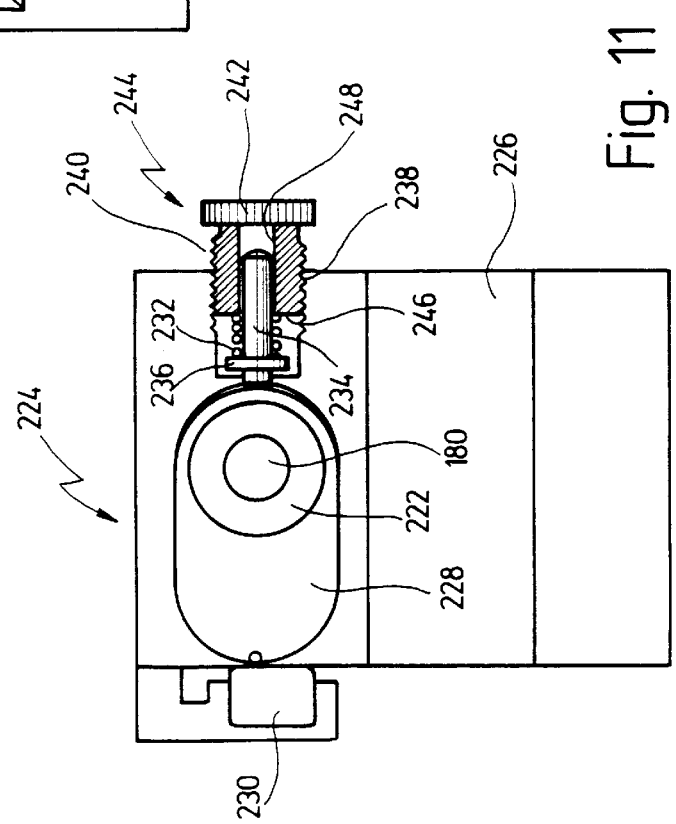

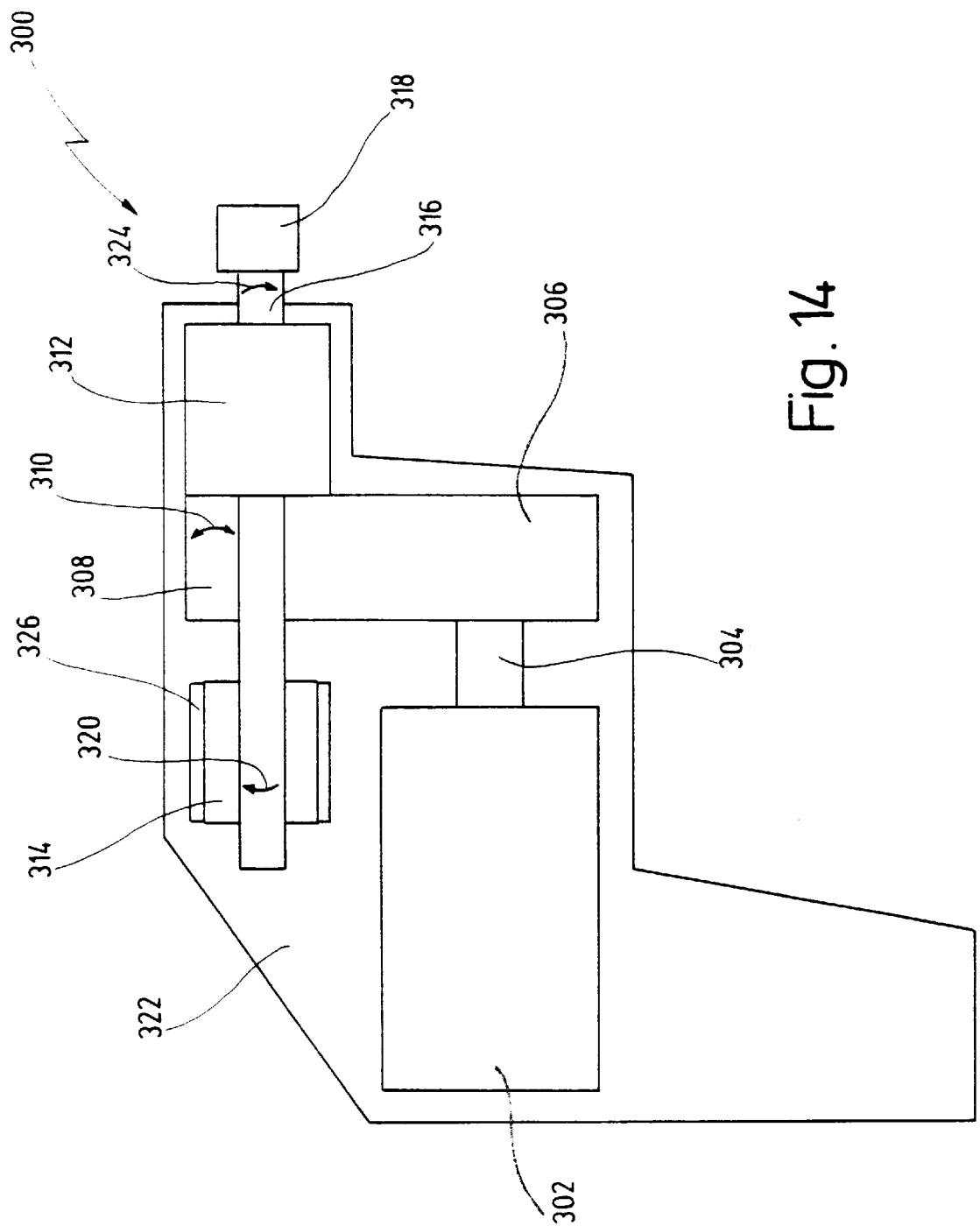

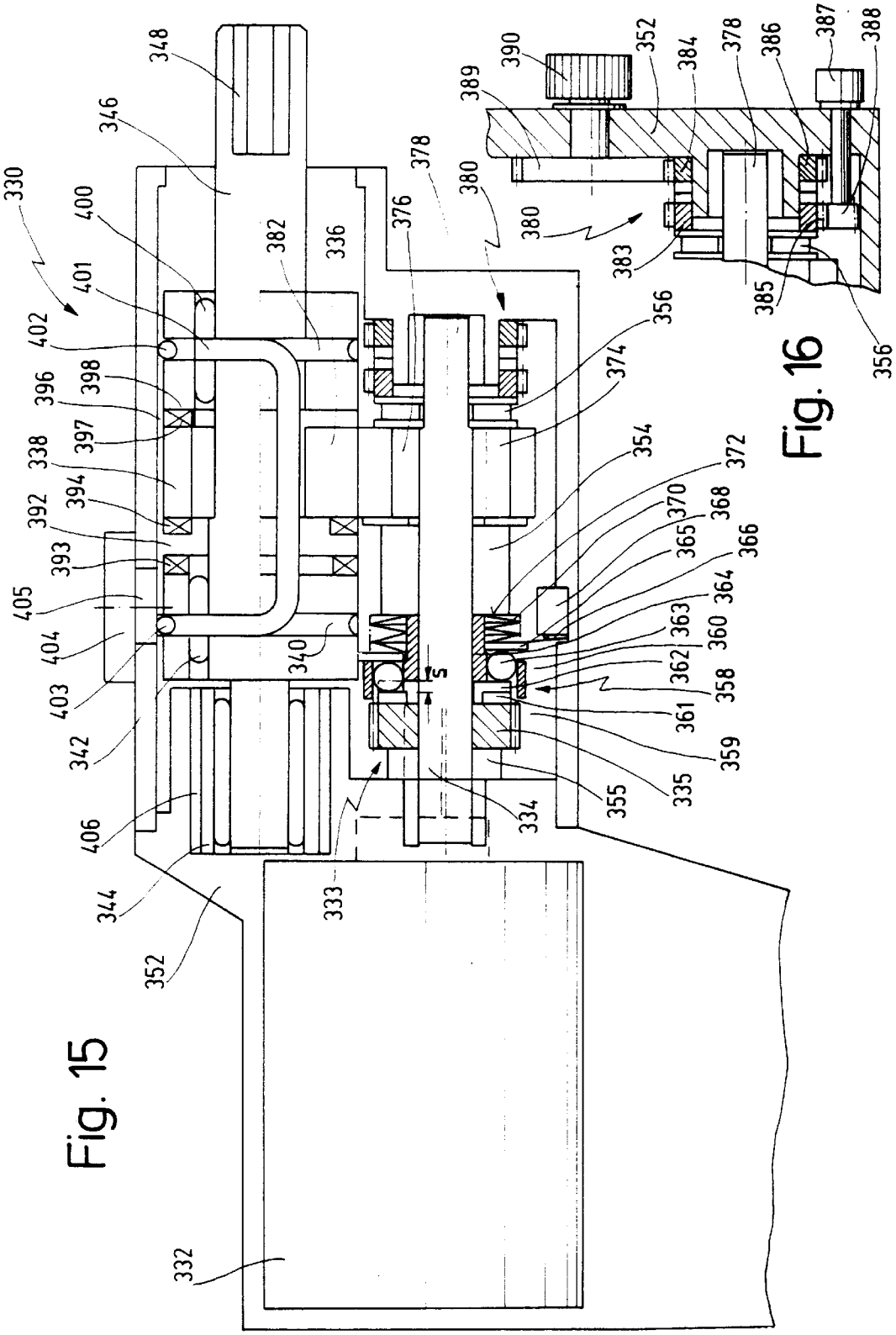

POWER TOOL

CROSS-REFERENCE TO RELATED APPLICATIONS

This is a continuation-in-part of International Application PCT/EP94/04281, with an international filing date of Dec. 12, 1994, now abandoned, which claims priority to German Patent Application P43 44 849.6 filed Dec. 29, 1993.

BACKGROUND OF THE INVENTION

The invention relates to a power tool in which the tool performs a rotary motion. The invention thus refers generally to power tools such as, for example, power drills, screwing devices, power sanders, saws, and other machines of this kind.

There basically exists with power tools of this kind the problem of transferring sufficient torque to the tool, while at the same time the input drive power is to be minimized.

With hand-held power tools there results in this connection the additional problem that the reaction torque of the power tool must be absorbed by the user, which is why in manual operation in many cases even an increase in input drive power does not make it possible to transfer a greater torque to the tool, since the hand-held power tool can no longer be held by the user. This limits the diameter, for example, when drilling core removal holes in stone or metal.

With power drills, attempts have already been made to get around the problem of reaction torque by using an electropneumatic impact mechanism on the principle of the hammer drill, which essentially achieves "shattering" of the stone being drilled. A principle of this kind is not, however, usable for core removal drilling in stone or metal.

To achieve a high tightening torque in screwing devices, pulse screwing devices or impact screwing devices, with which high torques of several hundred Nm can be achieved, are used.

But even here, relatively high reaction torques for the user are produced. In addition, the stress on the screws and nuts caused by the impact pulse can lead to damage. Lastly, pulse screwing devices of this kind are suitable only for very high torques, and do not allow any fine adjustment of a predefined torque.

U.S. Pat. No. 2,392,097 discloses a power drill with reversible rotation direction in which a ratchet drive mechanism is used to generate a back-and-forth rotary motion that can be converted, by means of a claw that snaps into place alternatively in one or the other rotation direction, into a rotary motion to drive the tool in one rotation direction or in an opposite rotation direction.

A ratchet drive mechanism of this kind that interacts with a snap-in claw is, however, usable only for extremely low drive speeds, generates a high noise level, and possesses a relatively low efficiency. Moreover the life of the ratchet drive mechanism is relatively limited.

It is therefore the object of the invention to create a power tool that is as universally usable as possible, and with which a high torque at the tool can be achieved with a relatively low input drive power.

A further object of the invention consists in creating a power tool that is suitable even for high rotation speeds, and generates relatively little noise.

An additional object of the invention consists in creating a hand-held power tool that has a high torque transfer with low reaction torque and good efficiency.

A further object of the invention consists in creating a screwing device that allows a high torque and that, even when the screwing device is held with only one hand, has a low reaction torque such as to permit working with little fatigue.

Also to be created in this connection is a screwing device that allows presetting of a torque which, when reached, causes torque transfer to be interrupted.

Shutoff is to be as reproducible as possible, and shall allow operation with as little noise as possible.

Also to be created is a power tool with a high torque even at relatively low input drive power, which is advantageously usable as a power drill, power sander, saw, or sheet-metal cutter.

SUMMARY OF THE INVENTION

These and other objects of the invention are achieved by a power tool which comprises a drive mechanism with an output shaft which performs a rotary motion oscillating back and forth about its longitudinal axis, and in which a tool drive shaft can be coupled to the output shaft, in order to drive a tool, via at least a first overrunning clutch, so as to convert the oscillating rotary motion of the output shaft into an intermittent rotary motion of the tool drive shaft in one working rotation direction.

Because the rotary motion is intermittent, only a relatively low reaction torque occurs. A relatively high torque can be exerted during the time period when the tool is moving forward in the rotation direction, since this is followed by a dead time during which the tool is not moved in the rotation direction or is in fact moved back in a direction opposite to the rotation direction. The result is thus that the tool is driven with high torque peaks, so that in almost all applications the working output of the tool is considerably improved as compared to conventional power tools with the same input drive power, and at the same time the reaction torque exerted on the user is considerably reduced.

The intermittent rotary motion of the output shaft is converted by the overrunning clutch into a rotary motion of the tool drive shaft which is quasi-continuous because of the inertia of the driven masses, and transitions increasingly into a discontinuous rotation motion as the load increases.

When the power tool according to the invention is used for material-removing operations, i.e. for example for drilling, sanding, or sawing, there is the additional advantage that a self-cleaning effect occurs at the tool. While with conventional power drills the drill bit clogs at the cutting edges during, for example, core removal drilling in stone, during core removal drilling with a power tool according to the invention a continuous self-cleaning takes place at the cutting edges due to the intermittent rotary motion, so that even with deep core removal holes, the drilling operation requires only infrequent interruptions in order to remove rock dust from the drill hole.

It is possible to achieve a considerably greater core removal hole diameter with a power tool according to the invention as compared with conventional core removal power drills, the reaction torque exerted being astonishingly low for a hand-held power tool.

Because of the excellent self-cleaning effect and the intermittent rotary motion, core removal holes in stone can be made dry, with no need for a cooling lubricant. Dust generation is greatly reduced as compared to conventional power drills. When drilling core removal holes into stone it is thus easily possible to achieve hole diameters of 50 mm and more with a hand-held tool.

Core removal holes can be made in metal with equal advantage. In this context the intermittent rotary motion generally results in short chips and greatly improved drilling performance; hole diameters of 30 to 50 mm and more can easily be achieved with hand-held tools.

A further advantageous application of the power tool according to the invention consists in drilling into stone. Results similar in quality to those with impact drilling can be achieved here, but because no impact, but rather only an intermittent rotary motion, is exerted, accurate holes can also be made in fragile materials, for example in tiles, flagstones, or even in glass.

A power tool according to the invention can also be used, with equal advantage, as a power sander; even with dry sanding, continuously high removal rates can be achieved due to the good self-cleaning effect. For example extraordinarily good removal performance results even when sanding with a flexible sanding disk, and even at a low rotation speed.

When a power tool according to the invention is used as a saw, the sawdust plume is on the one hand largely avoided as it is with conventional oscillating saws, and on the other hand uniform wear on the saw blade is achieved. Moreover there is the additional advantage, over conventional oscillating saws, that saw blades sharpened on one side can be used.

A power tool according to the invention can also be used advantageously as a sheet-metal cutter, very good cutting results being obtainable even at a low input drive power level.

When a power tool according to the invention is used as a screwing device, tightening torques of up to 35 Nm with hand-held tools can easily be obtained. Such high tightening torques were previously achievable only with pulse screwing devices or impact screwing devices.

A screwing device according to the invention is distinguished from conventional pulse screwing devices or impact screwing devices in particular by the fact that the tightening torque can be preset very accurately over a wide range if a corresponding torque shutoff system is provided.

Moreover the reaction torque is considerably reduced as compared with conventional screwing devices with a shutoff device. At the same time, screws or nuts that are to be tightened or loosened are subject to considerably less stress than when working with conventional pulse or impact screwing devices.

In an advantageous development of the invention, a damping device is provided that is coupled to the tool drive shaft in order to damp a reverse rotation of the tool drive shaft opposite to the working rotation direction.

This prevents a reverse rotation of the tool drive shaft during reverse rotation of the drive mechanism opposite to the working rotation direction, such as might be caused by frictional effects or the like.

In principle, it would be sufficient, for this purpose, to prevent reverse rotation of the tool drive shaft by means of, for example, a certain frictional engagement.

But because this simultaneously leads to losses in the desired input drive torque, it is particularly preferred if a second overrunning clutch, which prevents reverse rotation of the tool drive shaft opposite to the working rotation direction, is provided for this purpose.

This second overrunning clutch can, for example, be coupled to a housing of the power tool and to the tool drive shaft, the engagement direction being opposite to the engagement direction of the first overrunning clutch.

For example, when a torque is transferred for a certain period of time from the first overrunning clutch to the tool drive shaft in order to drive the tool, the second overrunning clutch freewheels during this period and allows a motion of the tool drive shaft in the working rotation direction, with no perceptible damping occurring.

On the other hand, when the output shaft moves back, in a subsequent time period, in the opposite rotation direction, this is basically made possible by the first overrunning clutch, since the latter allows free rotation of the tool drive shaft in this direction opposite to the working rotation direction. This theoretically makes possible, for example by means of frictional forces, a certain amount of reverse rotation of the tool drive shaft during this phase.

The damping device, however, damps a reverse rotation of the tool drive shaft opposite to the working rotation direction, or, when a second overrunning clutch is used as the damping device, completely prevents it, since the second overrunning clutch has an engagement device opposing the first overrunning clutch and thus, because it is fastened to the housing, prevents a reverse rotation of the tool drive shaft.

In this manner an even higher input drive torque can be achieved with the same input drive power.

In an additional development of the invention, the second overrunning clutch is not fastened directly onto the housing, but fastened resiliently, for example by means of a friction bearing, to the housing, so that a certain resilience of the tool drive shaft is made possible even when the second overrunning clutch is locked.

This measure has the advantage that in a hand-held power tool, the resulting reaction torque exerted on the hand is considerably reduced. This is achieved by the fact that the second overrunning clutch does not effect rigid locking upon reverse rotation of the output shaft, thus making it possible to work without fatigue with a hand-held power tool.

The intermittent rotary motion of the output shaft of the drive mechanism can generally be produced in various ways.

For example, the rotary motion of a drive motor can be converted via an oscillation drive mechanism into an oscillating rotary motion. Alternatively, a rotating magnet or stepping motor can be used, activated by a corresponding voltage pulse sequence.

In the first case the drive mechanism of the power tool according to the invention comprises a motor that is coupled to an oscillation drive mechanism by which a rotary motion of the motor shaft is converted into an oscillating rotary motion of the output shaft which drives the overrunning clutch.

Oscillation drive mechanisms of this kind are basically known (cf. for example EP 0 372 676, the disclosure of which is incorporated by reference), and can advantageously be used for this embodiment. Here an oscillating rotary motion about a stationary pivot axis is generated. The amplitude of the oscillating motion about the stationary rotation axis can be adapted to the particular application. Additionally, the frequency of the oscillation drive mechanism can be made variable, for example by means of an electronic speed control system, so as to regulate the output of the tool.

The oscillation drive mechanism can generally be embodied in various ways.

In a preferred embodiment, the oscillation drive mechanism comprises an eccentric element, driven by the motor shaft, by which a pivot element that is nonrotatably joined to the output shaft is driven.

Another possibility for producing an intermittent rotary motion of the output shaft consists in the use of a rotary magnet that is acted upon by a voltage pulse sequence in order to generate the intermittent rotary motion.

In an additional development of the invention, means are provided for interrupting a torque transfer from the output shaft to the tool drive shaft when a predefined torque is reached.

It is possible in this manner, when the power tool according to the invention is used as a screwing device, to achieve a presetting of the torque with which a screw is tightened.

In this connection, the means for interrupting the torque transfer can comprise a switch for shutting off the drive mechanism.

Alternatively or additionally thereto, a coupling can be provided that, in order to interrupt the torque transfer, releases when the predefined torque is reached.

The coupling can be coupled to a switch in order to shut off the drive mechanism when the coupling releases.

In an additional development of this embodiment, the coupling comprises two coupling halves, at least one of which is movable in the axial direction against the force of a spring element, an adjustment element being provided to preset the spring tension.

In an additional development of this embodiment, one of the two coupling halves comprises a plurality of balls in a holder, the other coupling half comprising a plurality of rollers in a holder that engage into gaps between the balls in order to allow positive torque transfer.

In this context the torque can be preset by the fact that the coupling half which is movable in the axial direction is joined to an intermediate shaft, said coupling half being displaceable in the axial direction by means of the adjustment element in order to set the shutoff torque of the clutch.

These measures ensure a precise shutoff in a reproducible manner when a predefined torque is reached, at the same time ensuring noiseless operation without any "chattering" of the release clutch.

Furthermore, in an additional development of the invention, a device is provided for reversing the rotation direction of the tool drive shaft. In this manner the power tool according to the invention can be advantageously used as a screwing device in right-hand or left-hand rotation mode. Reversal of the rotation direction can, in this connection, be made possible by the fact that a further overrunning clutch is provided, and that the tool drive shaft can be coupled alternatively, by means of a switching element, either with the first overrunning clutch or with the further overrunning clutch, in order to drive the tool drive shaft in either the one or the other rotation direction.

In an advantageous development of this embodiment, the output shaft is arranged between the first and the other overrunning clutch, and provided at both its ends with coupling elements with which are associated respective corresponding coupling elements on the first and on the other overrunning clutch, in order to constitute a first disconnect coupling between the output shaft and the first overrunning clutch, and a second disconnect coupling between the output shaft and the other overrunning clutch, the switching element being configured to shift the first and the other overrunning clutch together in the axial direction so as alternatively to close the first disconnect coupling in order to drive the tool drive shaft clockwise, or the second disconnect coupling in order to drive the tool drive shaft counterclockwise.

This achieves a reversal of the rotation direction in a particularly simple manner.

Thus in an advantageous embodiment of the invention a total of three overrunning clutches can be provided, specifically a first to drive the tool drive shaft clockwise; a second overrunning clutch that allows, with the switching element in a corresponding position, the tool drive shaft to be driven counterclockwise; and a third overrunning clutch that is preferably supported resiliently on the housing in order to damp a reverse rotation of the tool drive shaft opposite to the working rotation direction.

When the tool drive shaft is being rotated opposite to the engagement direction of the first overrunning clutch, i.e. for example counterclockwise, because the third overrunning clutch is in engagement with the tool drive shaft, the resilient support of the second overrunning clutch on the housing thus allows slippage, for example when the screwing device is in left-hand rotation mode. This is made possible by the configuration as a friction bearing; the friction that results when the friction bearing slips represents practically no disadvantage, since the left-hand rotation mode of the screwing device is used relatively seldom.

In an alternative embodiment of the invention, an interruption of the transfer of torque to the tool drive shaft when a predefined torque is reached can be achieved by the fact that the output shaft is held by two bearings arranged at a spacing from one another, the one bearing being immobilized in the radial direction of the output shaft, while the other bearing is arranged displaceably in the radial direction against a preload; and a sensor element being associated with the output shaft to shut off the drive mechanism when a radial displacement occurs.

This embodiment also makes possible a precise shutoff of the drive mechanism when a preset tightening torque is reached. Since one of the two bearings receiving the output shaft is arranged displaceably in the radial direction against a preload, as the torque increases at the end of a screwing operation the output shaft performs a slight tilting motion as soon as the reaction force exerted by the torque is great enough to overcome the effect of the preload acting on the displaceably arranged bearing. This tilting motion is detected by a sensor element and used to shut off the drive mechanism. According to this construction which is, in principle, known in the art (EP-B-0,182,986), a precise shutoff of the drive mechanism can be performed when a predefined torque is reached. The preload can be adjustable in order to allow adjustment of the shutoff torque, and the other bearing can be received by a plain guide which allows a displacement of the output shaft in the radial direction.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Further features and advantages of the invention are evident from the description below of preferred exemplified embodiments, with reference to the drawings, in which:

FIG. 6 shows a further exemplified embodiment of the invention as a screwing device in a schematic representation, a switching element for switching between right-hand and left-hand rotation mode, that is in the right-hand rotation mode position, being provided;

FIG. 7 shows a section of the switching element with the adjoining tool drive shaft, after the switching element has been switched over from right-hand to left-hand rotation mode;

FIG. 8a shows a schematic view of the disconnect device for disconnecting the tool drive shaft from the drive mechanism upon reaching a predefined limit torque when the machine is applied to a screw;

FIG. 8b shows a view according to FIG. 8a, showing in the top half the position when tightening a threaded connection and in the bottom half the position after release of the disconnect device;

FIG. 9 shows a simplified section through the oscillation drive mechanism according to FIG. 6;

FIG. 10 shows an embodiment, altered slightly as compared with the embodiment according to FIG. 6, of a screwing device according to the invention;

FIG. 11 shows a partly sectioned side view of the embodiment according to FIG. 10, from which the configuration of the device for shutting off the drive mechanism is visible;

FIG. 14 shows a further embodiment of a screwing device according to the invention, in an outline representation;

FIG. 15 shows a longitudinal section through a screwing device in an embodiment similar to the embodiment according to FIG. 14, in a schematic representation;

FIG. 16 shows a detailed representation of the screwing device according to FIG. 15, from which the adjustment capability for adjusting the shutoff torque is apparent;

DETAILED DESCRIPTION OF THE PREFERRED EMBODIMENTS

Figure 1:
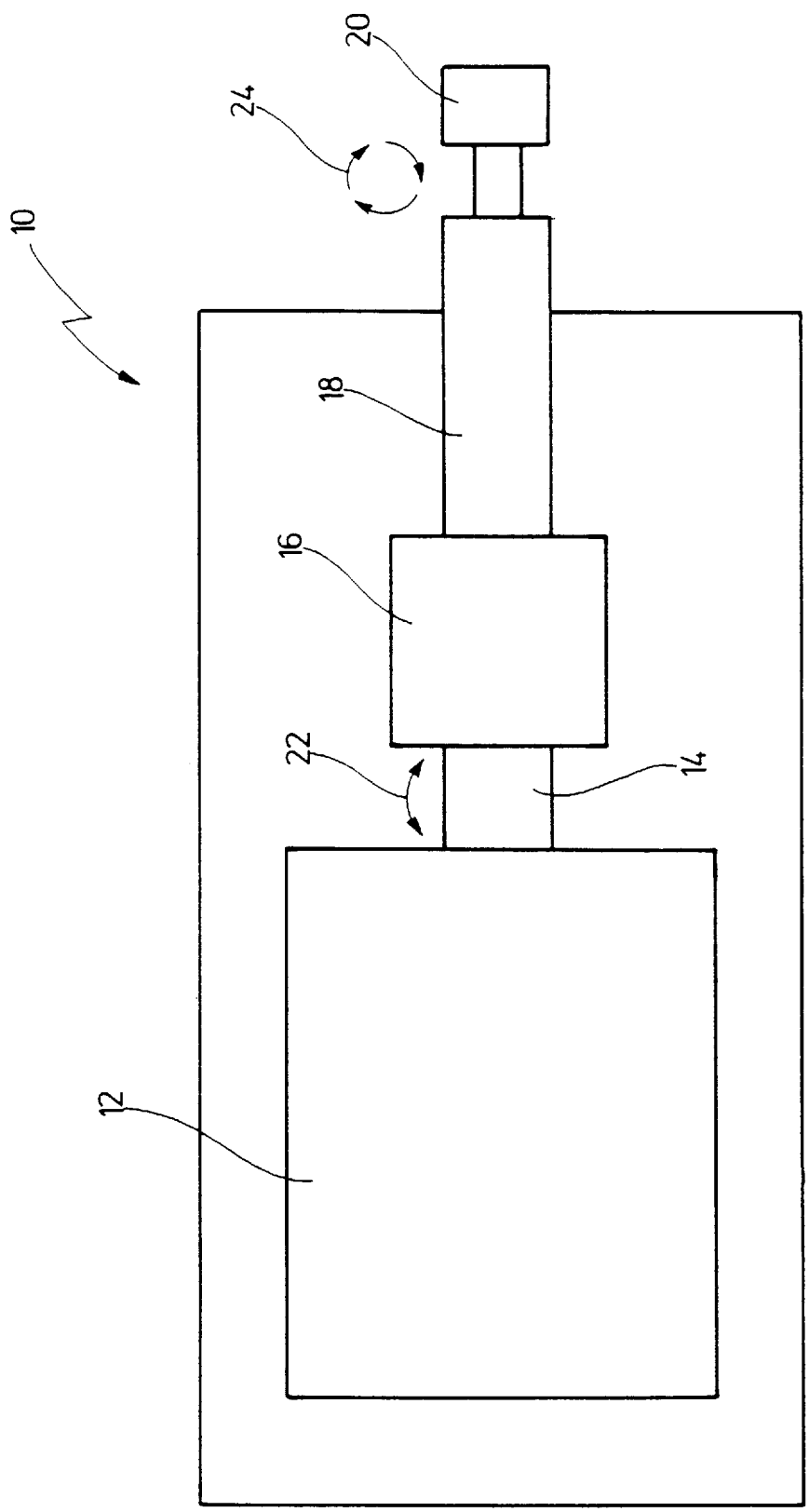
FIG. 1 shows a power tool according to the invention, in a schematic representation.

A first exemplified embodiment of the invention is shown in extremely schematic fashion in FIG. 1, and designated overall with the number 10. Power tool 10 comprises a drive mechanism 12, the output shaft 14 of which performs an intermittent rotary motion as indicated by arrow 22. This intermittent rotary motion of output shaft 14 is transferred to an overrunning clutch 16 that is joined to a tool drive shaft 18, on which a tool receptacle to receive a tool 20 is provided.

The intermittent rotary motion of output shaft 14 is converted by overrunning clutch 16 into a rotary motion of tool drive shaft 18, which because of the inertia of overrunning clutch 16, tool drive shaft 18, the tool receptacle, and tool 20, is a quasi-continuous rotary motion.

As the load on tool 20 increases, this quasi-continuous rotary motion transitions more and more into a discontinuous rotation motion (cf. arrow 24), i.e. while tool 20 rotates at approximately constant angular speed, due to the inertia of the drive mechanism, when there is no load on the machine, as the load increases the angular speed increasingly approaches a profile which varies periodically between the maximum value and a value of zero, so that a depiction of the angular speed over time yields a sawtooth profile.

The basic principle shown in FIG. 1 can be implemented or varied in different ways.

For example a motorized drive mechanism, the rotary motion of which is converted by an oscillation linkage into an oscillating motion of output shaft 14, can be selected as the drive mechanism.

Alternatively, the intermittent rotary motion can be produced by the fact that a rotary magnet or a stepping motor is acted upon by a corresponding voltage pulse sequence.

Moreover the rotation direction of tool drive shaft 18 can be configured reversibly, which is advantageous in particular for applications as a screwing device. Furthermore, in particular for applications as a screwing device, an adjustable torque shutoff system can additionally be provided, so that the screwing process is interrupted when a preset torque is reached. In this context the mechanical connection between drive train and tool can be interrupted. Additionally or alternatively, the drive mechanism can be shut off by means of a switch when the preset torque is reached.

Figure 2:
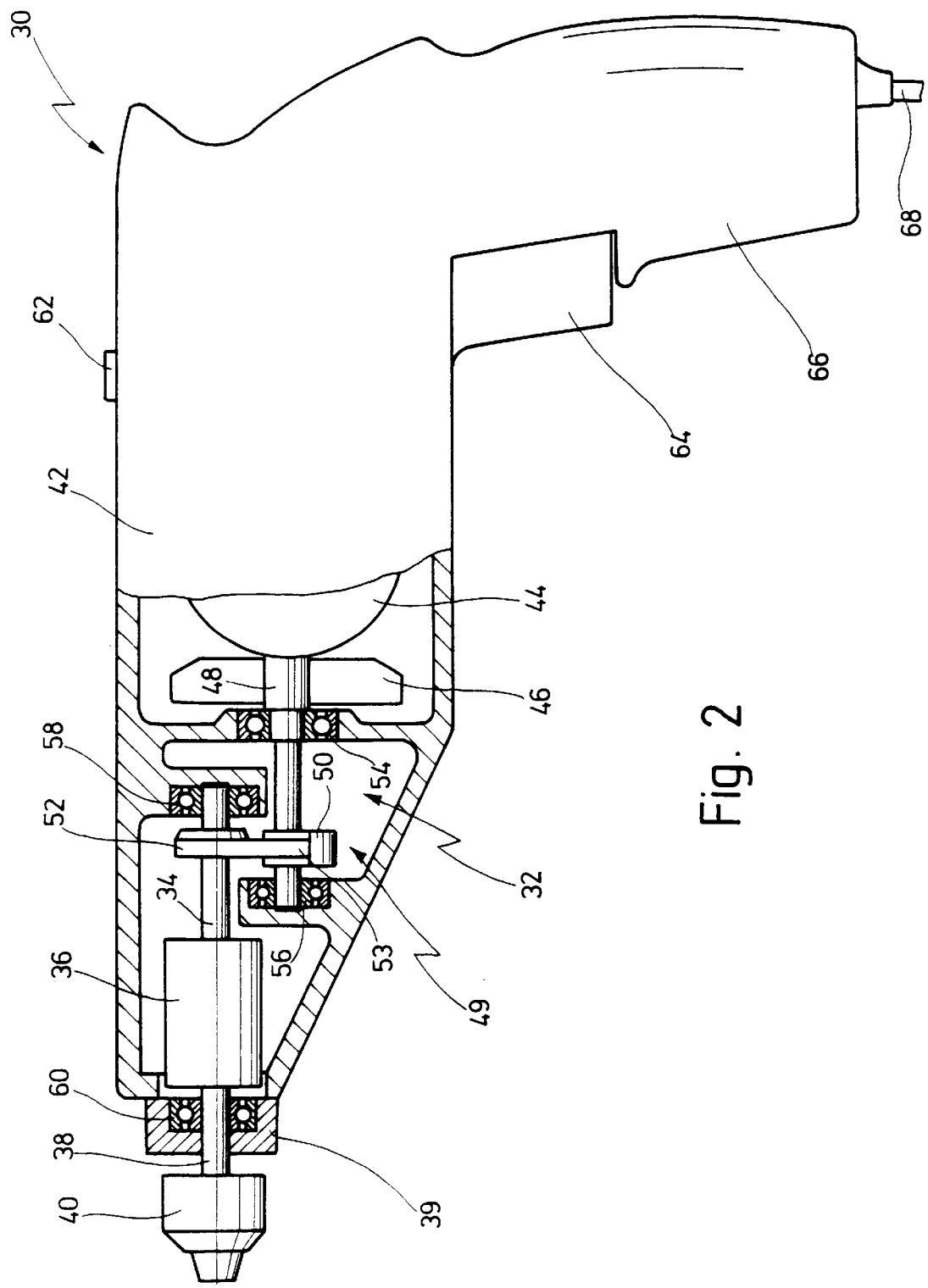
FIG. 2 shows an exemplified embodiment of the invention, embodied as a power drill or screwing device, in a partly sectioned side view.

In FIG. 2, an exemplified embodiment of the invention, embodied as a screwing device or power drill, is designated overall with the number 30. A drive mechanism designated overall with the number 32 is provided inside a housing 42, which has the form of a pistol-shaped hand-held power drill with a handle 66. The drive mechanism comprises an electric motor 44, the motor shaft 48 of which drives an oscillation drive mechanism, designated overall with the number 49, so as thereby to impart to output shaft 34 of oscillation drive mechanism 49 an oscillating rotary motion that is transferred to a downstream overrunning clutch 36 by which a tool drive shaft 38 with a tool receptacle 40, for example in the form of a drill chuck, is driven.

The illustrated power tool 30 is provided with power via a power cord 68, but alternatively could also be operated by means of a battery. A button 64 is provided on handle 66 for actuation, as is usual for hand-held power drills or hand-held screwing devices.

Electric motor 44, shown only in extremely schematic fashion with its rotor and fan 46, drives, via its motor shaft 48 that is supported at the front end by means of two bearings 54, 56, an eccentric 50 that is joined rigidly and nonrotatably to motor shaft 48.

Provided parallel to motor shaft 48 is output shaft 34 of oscillation drive mechanism 49, which is supported at its rear end, facing away from tool receptacle 40, on housing 42 by means of a bearing 58. A pivot lever 52 is arranged on output shaft 34 and joined rigidly and nonrotatably to it. Pivot lever 52 is substantially U-shaped, and surrounds eccentric 50 with its two ends 53. When eccentric 50 rotates about motor shaft 48, an oscillating rotary motion is thus imparted to output shaft 34.

This oscillating rotary motion is transferred by output shaft 34 to overrunning clutch 36, which can be of conventional design and can be configured, for example, as a drawn cup overrunning clutch. Overrunning clutch 36 can additionally be supported on housing 42 by means of a ball bearing or the like (not shown).

The output drive side of overrunning clutch 36 is rigidly joined to tool drive shaft 38, which is supported at machine neck 39 by means of a bearing 60, and carries tool receptacle 40 at its front end.

Also provided in handle 66 of power tool 30 is an electronic control system of conventional design for controlling the rotation speed of electric motor 44, the rotation speed being adjustable via an adjusting knob 62.

It is understood that oscillation linkage 49 can also, as an alteration to the oscillation linkage shown, be configured as an angled linkage if this is desired. For this purpose, output shaft 34 need merely be arranged at an angle to motor shaft 48, preferably at a right angle thereto. Pivot lever 52 provided on output shaft 34 then extends not perpendicular to motor shaft 48, but in a plane parallel to it.

Moreover power tool 30 as depicted can also be additionally fitted with a device for reversing rotation direction and with a torque shutoff system, as explained briefly below with reference to the exemplified embodiment according to FIG. 3.

Figure 3:
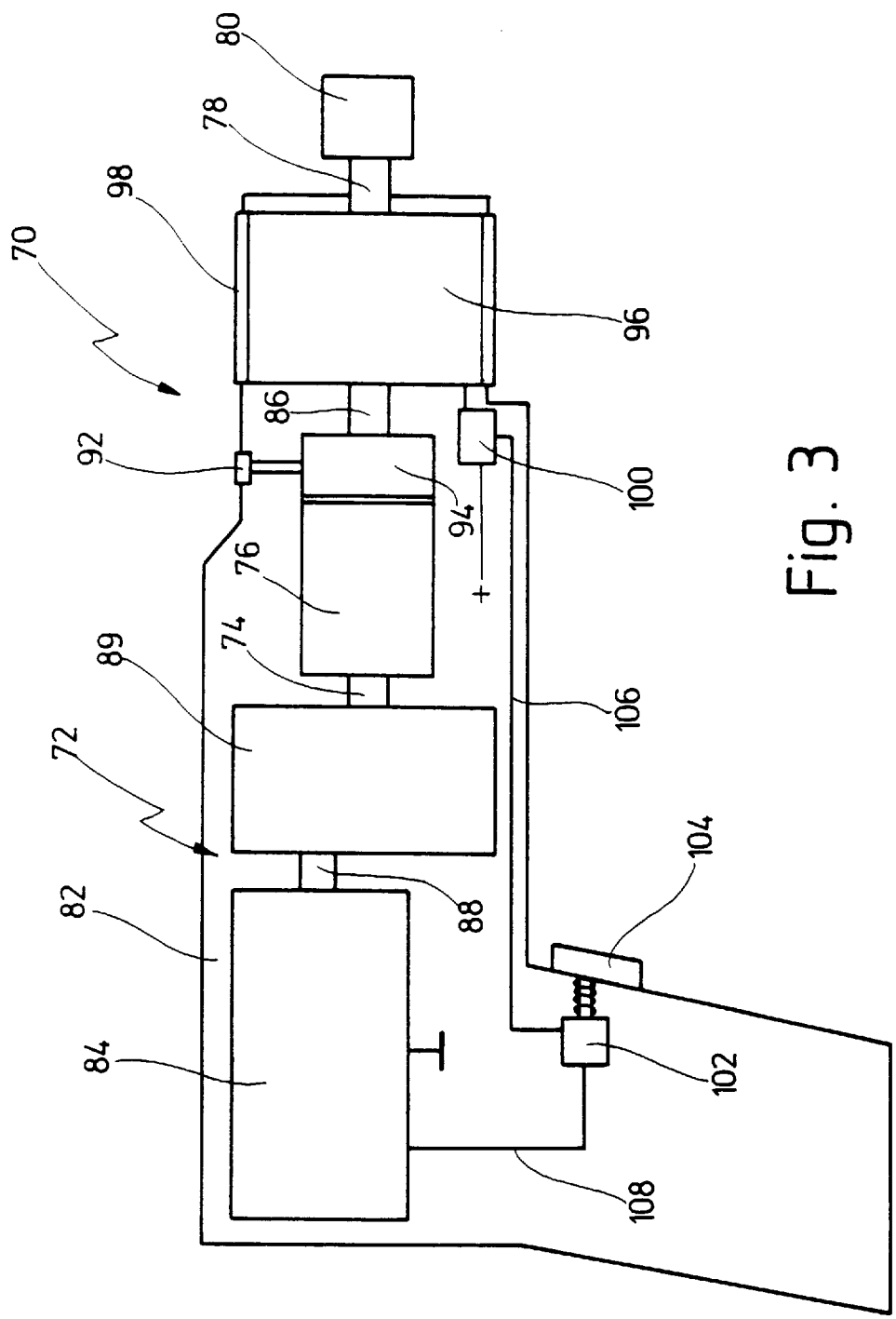
FIG. 3 shows a further exemplified embodiment of the invention, in a schematic representation.

In FIG. 3 a further exemplified embodiment of the invention as a power screwdriver or power drill is shown in extremely schematic fashion and designated overall with the number 70. An electric motor 84, whose motor shaft 88 drives an oscillation drive mechanism 89, is provided inside a housing 82. Oscillation drive mechanism 89 can, for example, correspond to the embodiment described earlier with reference to FIG. 2, or can also be configured in accordance with EP 0 372 376 B1.

Output shaft 74 of oscillation drive mechanism 89 drives overrunning clutch 76, which is additionally equipped with a device 94 for reversing rotation direction that can be actuated from outside housing 82 via an adjusting lever 92.

Overrunning clutch 76 drives, via an intermediate shaft 86, a shutoff device to shut off drive mechanism 72 when a presettable torque is reached.

Shutoff devices of this kind are fundamentally known (cf. for example U.S. Pat. No. 4,671,364 which is incorporated by reference).

Shutoff device 96 has an adjustment ring 98, actuatable from outside housing 82, by means of which the shutoff torque can be adjusted. When the preset torque is reached, intermediate shaft 86 is disconnected from tool drive shaft 78, and additionally a switch 100 is actuated to switch off electric motor 84. Switch 100 is connected via a lead 106 to a further switch 102 that can be actuated via a button 104 to switch on electric motor 84. Switch 102 is connected via a lead 108 to electric motor 84.

Thus as soon as the reaction torque exerted by tool 80 on tool drive shaft 78 exceeds a torque value preset with adjustment ring 98, on the one hand electric motor 84 is switched off via switch 100, and on the other hand the connection between intermediate shaft 86 and tool drive shaft 78 is disconnected.

It is understood that in the embodiments described above, a pneumatic motor, hydraulic motor, or other kind of motor can also be used as the drive motor.

Figure 4:
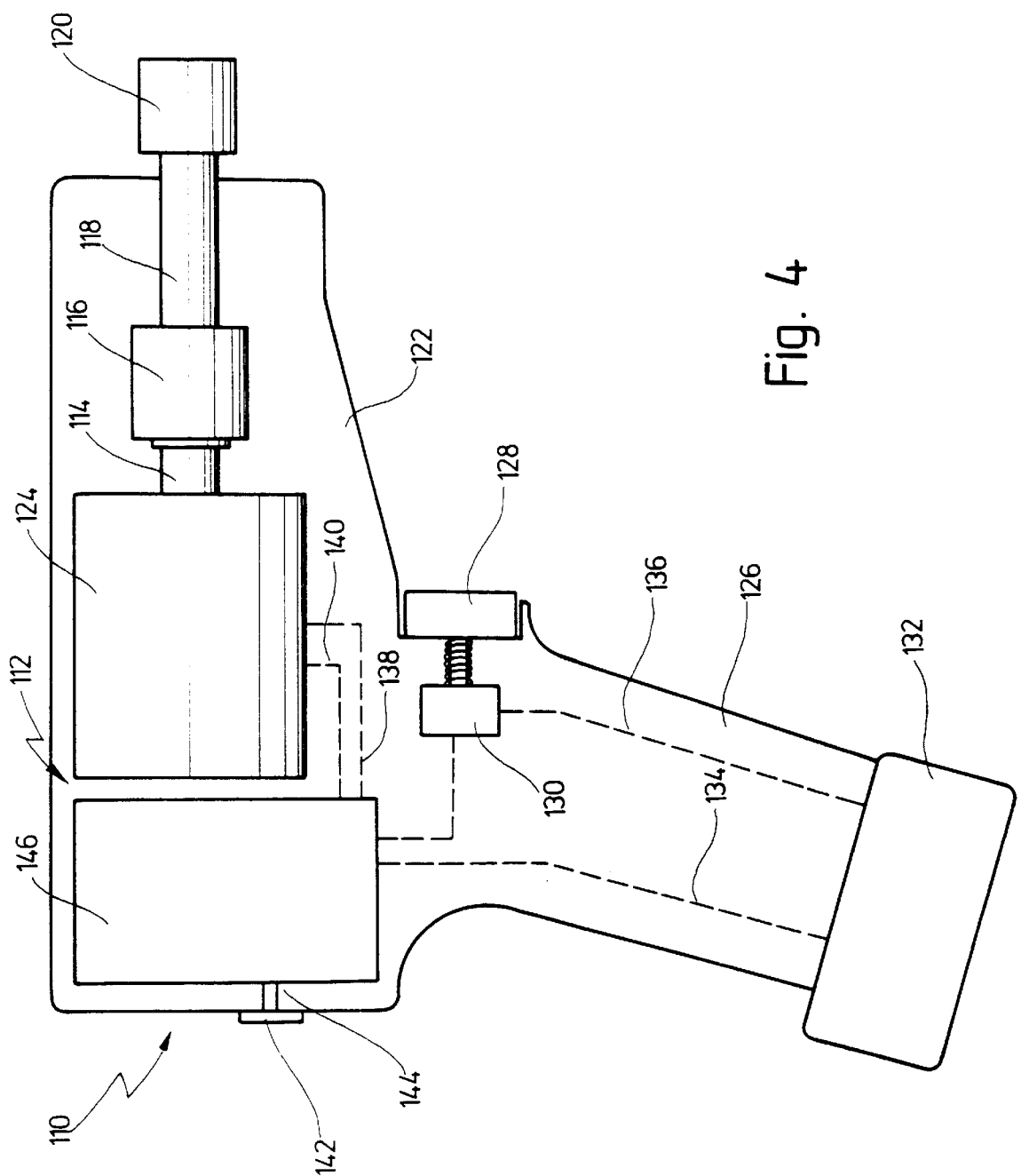
FIG. 4 shows a further exemplified embodiment of the invention as a battery-driven screwing device, in a schematic representation.

A further exemplified embodiment of the invention is depicted in extremely schematic fashion in FIG. 4, and designated overall with the number 110.

This is a battery-driven screwing device that, in contrast to the embodiments described previously, is driven not in motorized fashion but by means of a rotary magnet. Drive mechanism 112 comprises a unidirectional rotary magnet 124 that is pushed against its rotation direction by a return spring (not shown). A square-wave voltage pulse sequence of constant frequency is applied to rotary magnet 124 via an electronic control system 146, which will be explained briefly below with reference to FIG. 5. Output shaft 114 of the rotary magnet drives, in the manner described above, an overrunning clutch 116 by which a tool drive shaft 118 is driven in order to drive a tool receptacle 120.

A battery 132, arranged replaceably in handle 126 of housing 122, is provided in order to supply power.

Battery 132 is connected via leads 134, 136 to electronic control system 146 and to an on/off switch 130 that can be actuated via a button 128.

Electronic control system 146 has a torque adjusting system 144 that can be actuated via an adjusting ring 142 from outside housing 122.

Rotary magnet 124 is caused to rotate for the duration of a voltage pulse. During the subsequent period when no voltage is being applied, rotary magnet 124 is moved back by the return spring until a forward rotation again occurs as the next voltage pulse rises.

The achievable output or tightening torque of the screwing device can be adjusted, via the pulse energy, using a pulse width modulation system (PWM), the torque transferred to the tool being dependent on the pulse energy.

Figure 5:
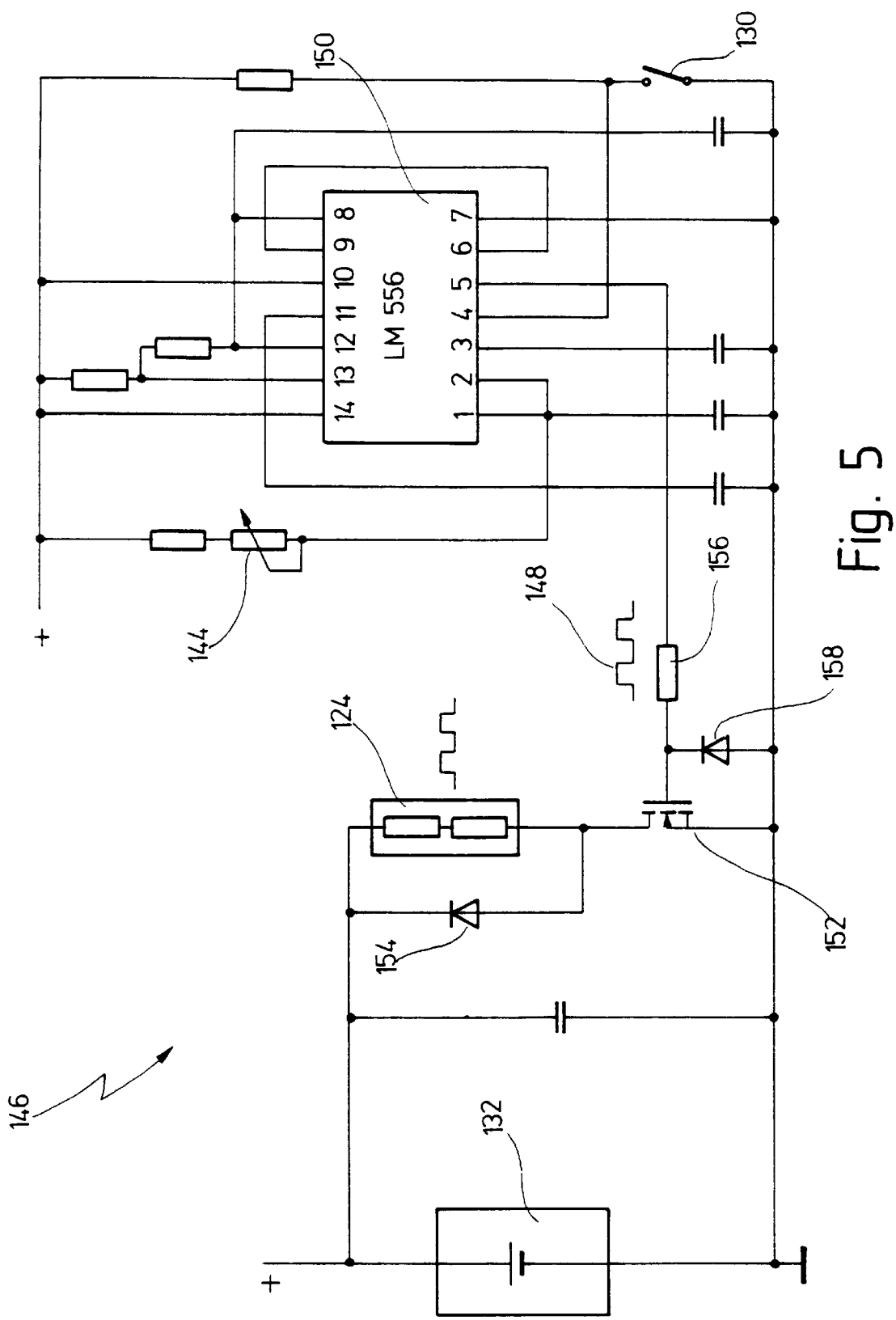
FIG. 5 shows a circuit diagram of the electronic control system for the exemplified embodiment according to FIG. 4.

The voltage pulse sequence, indicated schematically in FIG. 5 with the number 148, can be generated by electronic control system 146, which is constructed for example according to the circuit shown in FIG. 5. Used for this purpose is a timer, for example an LM 556, the discharge and threshold inputs 1 and 2 of which are connected via a controllable resistor 144 and a protective resistor to the positive supply voltage. The voltage delivered from output 5 of timer 150 is applied to a resistor 156 which is connected via a diode 158 to ground.

A switch 152, which for example can be configured as a field-effect transistor (FET), is triggered by this voltage which drops at resistor 156. Rotary magnet 124 is located between the positive supply voltage and switch 152, and is shorted out by a diode 154.

The pulse energy can be adjusted by setting adjustable resistor 144, thus changing the pulse width.

It is understood that the circuit explained briefly above represents only one of many possible embodiments, and that numerous other possibilities exist for generating voltage pulse sequence 148.

FIGS. 6 to 9 and 9 to 11 describe two further exemplified embodiments, with reference to which the device for reversing the rotation direction of the tool drive shaft, the shutoff device for shutting off the drive mechanism when a pre-defined torque is reached, and the device for disconnecting the tool drive shaft from the drive mechanism, will be explained in more detail.

In FIG. 6 a power tool according to the invention that is utilized in particular as a screwing device is shown in extremely schematic fashion and designated overall with the number 160.

Power tool 160 comprises, as in the case of the embodiments described above with reference to FIGS. 2 and 3, an electric motor 162 that drives an output shaft 180 via an oscillation drive mechanism 164. Drive shaft 180 can be alternatively connected, either via a first overrunning clutch 188 that engages in the clockwise direction, or via a further overrunning clutch 190 that engages in the counterclockwise direction, to a tool drive shaft 200 in order to drive a tool inserted into a tool receptacle 202 of too drive shaft 200. A switching element designated overall with the number 184 serves to change over between first overrunning clutch 188 and further overrunning clutch 190, i.e. to change over between right-hand and left-hand rotation mode.

Oscillation drive mechanism 164 comprises, according to FIGS. 6 and 9, an eccentric element 170 arranged on motor shaft 168, which is supported at its end projecting out of the motor housing on a flanged-on holder 166 by means of a bearing 181. Eccentric element 170 is surrounded by a needle roller bushing 172, which serves as pivot bearing. Arranged nonrotatably on output shaft 180 is a pivot element 174, on the section of which projecting toward motor shaft 168 two pivot arms 176, between which needle roller bushing 172 is enclosed on both sides, are constituted by a U-shaped section. The two sliding surfaces 178 adjacent to needle roller bushing 172 are machined to a tight-fitting dimension so as to allow clearance-free transfer of the back-and-forth motion of eccentric element 170 to pivot element 174, which thus imparts to output shaft 180 an oscillating motion about its longitudinal axis 185.

Switching element 184 is configured as a cylindrical switching sleeve that is supported in axially displaceable fashion on output shaft 180. Arranged in switching sleeve 184 are, one behind another, first overrunning clutch 188, a bearing 186, and further overrunning clutch 190. Switching sleeve 184 is axially displaceable on output shaft 180 with bearing 186, and is displaceable in the axial direction, with a second bearing 196 that is provided at its front end facing toward tool receptacle 202, on tool drive shaft 200.

In the position shown in FIG. 6, switching sleeve 184 is in a first position, slid forward toward tool receptacle 202, in which its end surface, facing toward tool receptacle 202 and equipped with radially extending lugs 205, engages between lugs 207 (FIGS. 8a, b), of a first coupling element 208 of a downstream disconnect device designated overall with the number 198, with which they constitute a claw coupling 206.

In the position illustrated in FIG. 6, torque is therefore transferred from output shaft 180 via first overrunning clutch 188 to switching sleeve 184, from which the drive torque is transferred via claw coupling 206 and disconnect device 198 to tool drive shaft 200. In this position, further overrunning clutch 190 is inoperative. Tool drive shaft 200 has a smaller diameter than output shaft 180, and is supported, at its end facing output shaft 180, against it by means of a thrust bearing, which is indicated by the number 192 and in the simplest case is configured as a ball that is held in corresponding recesses of output shaft 180 and tool drive shaft 200. Tool drive shaft 200 is furthermore penetrated at its end facing output shaft 180 by a transverse pin 194, both ends of which project laterally and radially out of tool drive shaft 200. In the position shown in FIG. 6, the ends of transverse pin 194 can rotate freely inside further overrunning clutch 190, so that the latter is entirely inoperative. If, on the other hand, sliding sleeve 184 is slid back to the right toward oscillation drive mechanism 164 into the position shown in FIG. 7, this transverse pin 194 then enters a longitudinal slot 197 that extends between second bearing 196 and further overrunning clutch 190. A positive connection is thereby produced between switching sleeve 184 and tool drive shaft 200 in the position shown in FIG. 7.

In the left-hand rotation position shown in FIG. 7, further overrunning clutch 190 comes into engagement, since it now surrounds the shaft end of output shaft 180. First overrunning clutch 188, however, is out of engagement in the left-hand rotation position according to FIG. 7, since in this position first overrunning clutch 188 surrounds a smaller-diameter shaft section 183 of output shaft 180. Thus in the left-hand rotation position of switching sleeve 184 shown in FIG. 7, tool drive shaft 200 is driven by output shaft 180 via further overrunning clutch 190 and switching sleeve 184 by means of transverse pin 194 engaging into longitudinal slot 197 of switching sleeve 184. On the other hand the power flow in the right-hand rotation position shown in FIG. 6, as already mentioned, runs from output shaft 180 via first overrunning clutch 188 to switching sleeve 184, and from it by means of claw coupling 206 via disconnect device 198 to tool drive shaft 200.

Furthermore, there is arranged at the outer end of output shaft 180 a shutoff device, designated overall with the number 224, for shutting off motor 162 when a predefined torque is reached, which will be explained in more detail below with reference to FIG. 10.

Details and the operation of disconnect device 198 will now be explained in more detail with reference to FIGS. 6 and 8.

Disconnect device 198 consists of first coupling element 208, an intermediate coupling element 210, and a second coupling element 212. A spring element 214, that is configured as a helical spring and presses intermediate coupling element 210 against second coupling element 212, is arranged between first coupling element 208 and intermediate coupling element 210. First coupling element 208 is configured as a coupling disk and is arranged rotatably, but non-displaceably in the axial direction, on tool drive shaft 200. As already mentioned, first coupling element 208 has, on the side facing switching sleeve 184, radially extending lug members 207 in order to constitute, with the corresponding lug members 205 on the end surface of switching sleeve 184, a claw coupling 206 that, in the right-hand rotation position shown in FIG. 6, ensure a transfer of torque from switching sleeve 184 to first coupling element 208.

Provided on the side of first coupling element 208 facing intermediate coupling element 210 are stepped lug members 209, which have a straight section extending out from the end surface in which engagement flank 215 extends perpendicular to a radial plane, adjacent to which is an oblique section in which engagement flank 216 extends obliquely with respect to a radial plane. This oblique section of each lug 209 terminates at end surface 217 of the lug, which extends parallel to a radial plane.

Intermediate coupling element 210 has, on its side facing first coupling element 208, straight lugs 211 that extend in the radial direction.

Second coupling element 212 is configured as a transverse pin which passes radially through tool drive shaft 200 and projects therefrom at both its ends. Intermediate coupling element 210, which is arranged freely rotatably and axially displaceably on tool drive shaft 200, has on its side facing second coupling element 212, in its enveloping surface, two V-shaped recesses offset 180 degrees from one another, which each constitute oblique guide cams 213 for transverse pin 212, along which the latter can slide.

Disconnect device 198 operates as follows:

When the screwing device is applied onto a screw, initially spring element 214 is compressed by the applied pressure and intermediate coupling element 210 is pressed by the spring pressure against second coupling element 212, so that the transverse pin lies against the end of guide ramp 213 facing intermediate coupling element 212, resulting in the position drawn in FIG. 8a. In the right-hand rotation position, output shaft 180 then transfers its oscillating drive motion to first overrunning clutch 188, by which this motion is converted into an intermittent clockwise drive motion that is transferred by switching sleeve 184, via lugs 205, 207 of claw coupling 206, to first coupling element 208.

Because of the transferred torque, the straight lugs 211 of intermediate coupling element 210 initially mesh between the straight engagement flanks 215 of lugs 209 of first coupling element 208, so that the disconnect coupling is meshed and the torque is positively transferred. As a result of the transferred torque, intermediate coupling element 210 then moves with its guide cams 213, against the spring force, along the two ends of transverse pin 212, resulting in the position drawn in the top half of FIG. 8b.

As the threaded connection is tightened, in the last phase the torque then increases until shutoff device 224 shuts off motor 162.

Since now no further torque is being transferred, intermediate coupling element 210 is pushed by tensioned spring element 214 into the end position against transverse pin 212 in which the round end of V-shaped guide cam 213 comes into contact against transverse pin 212, thus releasing the disconnect coupling and resulting in the position drawn in the bottom half of FIG. 8b.

The design of the shutoff device for shutting off electric motor 162 will now be explained in more detail with reference to FIGS. 10 and 11.

A power tool slightly altered as compared to the embodiment according to FIG. 6 is shown in FIG. 10 and designated overall with the number 220.

In this context, the same reference numbers as in the embodiment according to FIG. 6 are used for corresponding parts.

The embodiment according to FIG. 10 differs from the embodiment according to FIG. 6 substantially in that output shaft 180 is extended rearward so that electric motor 162 extends parallel to a region of output shaft 180 elongated beyond oscillation drive mechanism 164. The overall result is thus a long configuration of power tool 220 in contrast to a short configuration of power tool 160 according to FIG. 6, in which electric motor 162 is arranged parallel to output shaft 180 in such a way that slide sleeve 184 is arranged, and is displaceable, approximately parallel to electric motor 162.

In the embodiment according to FIG. 10 as well, a shutoff device 224 for shutting off the electric motor when a preset torque is reached is arranged at the end of output shaft 180 facing away from sliding sleeve 184. Its design corresponds entirely to the design of shutoff device 224 indicated in FIG. 6.

Shutoff device 224 has, according to FIG. 10, a holder 226 that is flanged onto electric motor 162 and in which output shaft 180 is supported, at its end opposite tool drive shaft 200, with a bearing 222. The other end of output shaft 180 is supported by means of bearing 186, in the manner described above with reference to FIG. 6, on switching sleeve 184, which in turn is supported with its second bearing 196 on tool drive shaft 200 and is axially displaceable with respect to it. The end of output shaft 180 facing tool drive shaft 200 is thus immobilized in the radial direction by switching sleeve 184, by means of bearing 186 and bearing 196, tool drive shaft 200 being in turn supported at its other end on machine housing 203 with bearing 204.

The other bearing 222 of output shaft 180 is, as is evident in detail from FIG. 11, mounted by means of a plain guide 228 so as to allow a certain amount of displacement in the radial direction. The other bearing 222 is preloaded in the radial direction by an adjustment device 244 by means of a spring 232, so that it is pushed toward a sensor element that is arranged on the opposite side of plain guide 228.

When a preset limit torque is reached, output shaft 180 deflects with its other bearing 222 against the preload of spring 234, resulting in a tilting motion of output shaft 180. This tilting motion causes sensor element 230 to receive a signal, which causes shutoff of the electric motor. Advantageously, sensor element 230 is at the same time configured as a shutoff switch for electric motor 162.

Since the required tilt angle is extraordinarily small, and even a slight displacement of output shaft 180 in the radial direction at its other bearing 222 is sufficient to result in a shutoff of electric motor 162, this slight clearance is always taken up by the support bearing and does not have a disadvantageous effect on the function of output shaft 180.

In order to allow an adjustment of the preload acting in the radial direction on output shaft 180, an adjustment device designated overall with the number 244, which has an adjustment element 240 that is configured as a threaded plug that is adjustable from outside in a thread 238 of holder 226 by means of an adjustment ring 242, is provided. The other bearing 222 is acted upon via a pin 234 by the force of spring element 232, which is enclosed between a collar 236 of pin 234 and end surface 246 of adjustment element 240. Pin 234 is received displaceably, at its end opposite output shaft 180, in a central hole 248 of adjustment element 240. When adjustment element 240 is screwed farther into thread 238 by turning adjustment ring 242, the preload of spring element 232 is increased, so that shutoff of electric motor 162 occurs only at a higher shutoff torque. When the threaded plug is, on the other hand, unscrewed farther out of thread 238, the preload of spring element 232, which is preferably configured as a helical spring surrounding pin 234, is decreased, resulting in a lower shutoff torque.

Figure 12:
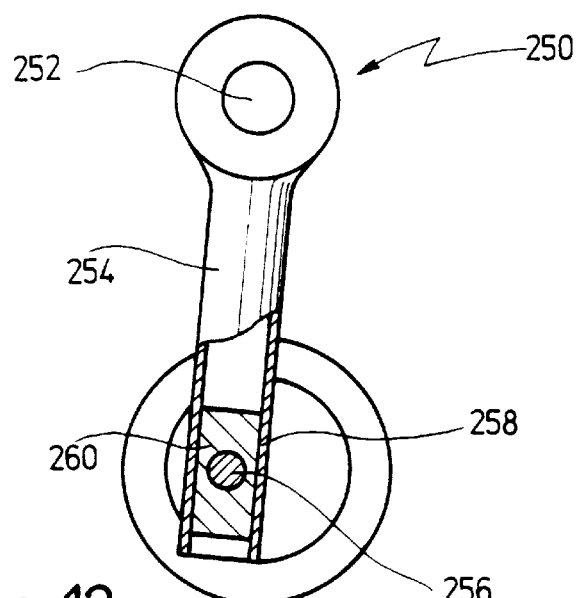
FIG. 12 shows a partly sectioned view of an alternatively designed oscillation drive mechanism for a power tool according to the invention.

An alternative embodiment of the oscillation drive mechanism is shown schematically in FIG. 12 and designated overall with the number 250. An eccentric element 256, which is joined in rotationally movable fashion to an approximately cylindrical piston 260, is driven by the motor shaft. Piston 260 is received by a hollow cylindrical guide 258 of a pivot element 254, the other end of which is joined nonrotatably to output shaft 252. When the motor shaft rotates, the motion of eccentric element 256 is transferred via piston 260 to pivot element 254, piston 260 being guided inside hollow cylindrical guide 258 and performing a back-and-forth motion. The motion of eccentric element 256 is thus converted by pivot element 254 into an oscillating rotary motion of output shaft 252.

It is understood that numerous further possibilities for configuring the oscillation drive mechanism are available. Some of them are evident, for example, from EP 0 372 376 B1, to which reference is hereby made.

Figure 13:
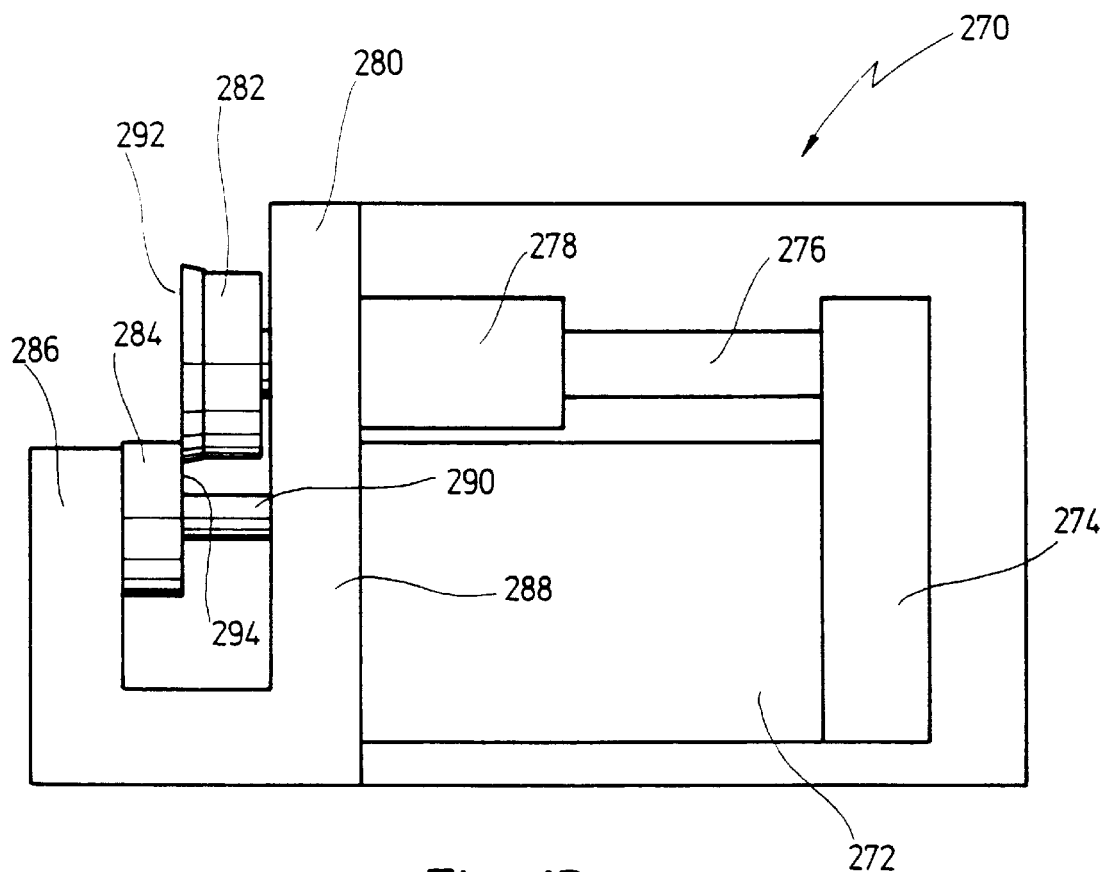
FIG. 13 shows a schematic view of a power tool according to the invention that is configured as a sheet-metal cutter.

A further potential application of the invention is shown in extremely schematic fashion in FIG. 13, and designated overall with the number 270.

A holder 280, which has a substantially U-shaped cross section, receives between its two opposing limbs 286, 288 a counterroller 204 that is supported rotatably by means of a shaft 290. Arranged above counterroller 284, on an extension of second limb 288 of holder 280, is a cutting roller 282, end surface 292 of which lies in contact with end surface 294 of counterroller 284 so as thus to constitute a small overlap region between cutting roller 282 and counterroller 284.

When a rotational motion is then imparted to cutting roller 282, an object that is fed in laterally via counterroller 284 can be cut, in a manner known in the art, by the two end surfaces 292, 294 rolling opposite to one another at the transition point between the two rollers 282, 284; this can be used in particular to cut metal sheets. According to the invention, the drive mechanism for the cutting roller then consists of an electric motor 272 that drives, via an oscillation drive mechanism 274, an output shaft 276 whose intermittent rotary motion is converted by an overrunning clutch 278 into a drive motion for cutting roller 282. Power tool 270 can thus be used as a sheet-metal cutter, a high cutting performance being achievable even at a relatively low drive power.

It is understood that other applications of the invention, for example as a power sander or a saw, are advantageously possible even though these are not shown in the drawings.

A further embodiment of a power tool according to the invention as a screwing device is shown in FIG. 14 and designated overall with the number 300.

Here again an oscillation drive mechanism 306, which imparts a back-and-forth oscillating motion to an output shaft 308 as indicated by arrow 310, is driven by motor shaft 304 of a motor 302. Output shaft 308 that is driven by oscillation drive mechanism 306 is supported in rotationally movable fashion on a tool drive shaft 316, and joined to a first overrunning clutch 312. First overrunning clutch 312 acts on tool drive shaft 316, on whose front end a tool receptacle 318 is provided.

As already explained for the previous embodiments, the back-and-forth oscillating motion of output shaft 308 is converted by first overrunning clutch 312 into an intermittent clockwise rotary motion of tool drive shaft 316, as indicated by arrow 324.

In a development of the previously described embodiments, however, an additional damping device is provided in order to prevent, in the event of a reverse rotation of output shaft 308 against the working rotation direction of tool drive shaft 316 depicted by arrow 324, a reverse rotation of tool drive shaft 316 caused, for example, by frictional effects.

For this purpose a second overrunning clutch 314, that is fastened via a friction bearing 326 directly to housing 322 of power tool 300, is provided at the end of tool drive shaft 316 opposite first overrunning clutch 312.

If output shaft 308 then moves, in an "idle stroke" during a certain time period, opposite to working rotation direction 324, a reverse rotation of tool drive shaft 316 in the direction of arrow 320 opposite to working rotation direction 324, resulting for example from frictional effects, is prevented, since second overrunning clutch 314 has an engagement direction which is opposite to the engagement direction of first overrunning clutch 312. Second overrunning clutch 314 thus prevents a reverse rotation of tool drive shaft 316 counterclockwise, in the direction of arrow 320.

Since, however, second overrunning clutch 314 is not fastened rigidly to housing 322 but is fastened to housing 322 indirectly via a friction bearing 326, a certain resilience of tool drive shaft 316 in the direction of arrow 320 is still possible when second overrunning clutch 314 locks, i.e. prevents a reverse rotation of tool drive shaft 316; this reduces the reaction torque exerted on the hand, as explained with reference to FIGS. 17 and 18.

Figure 17:
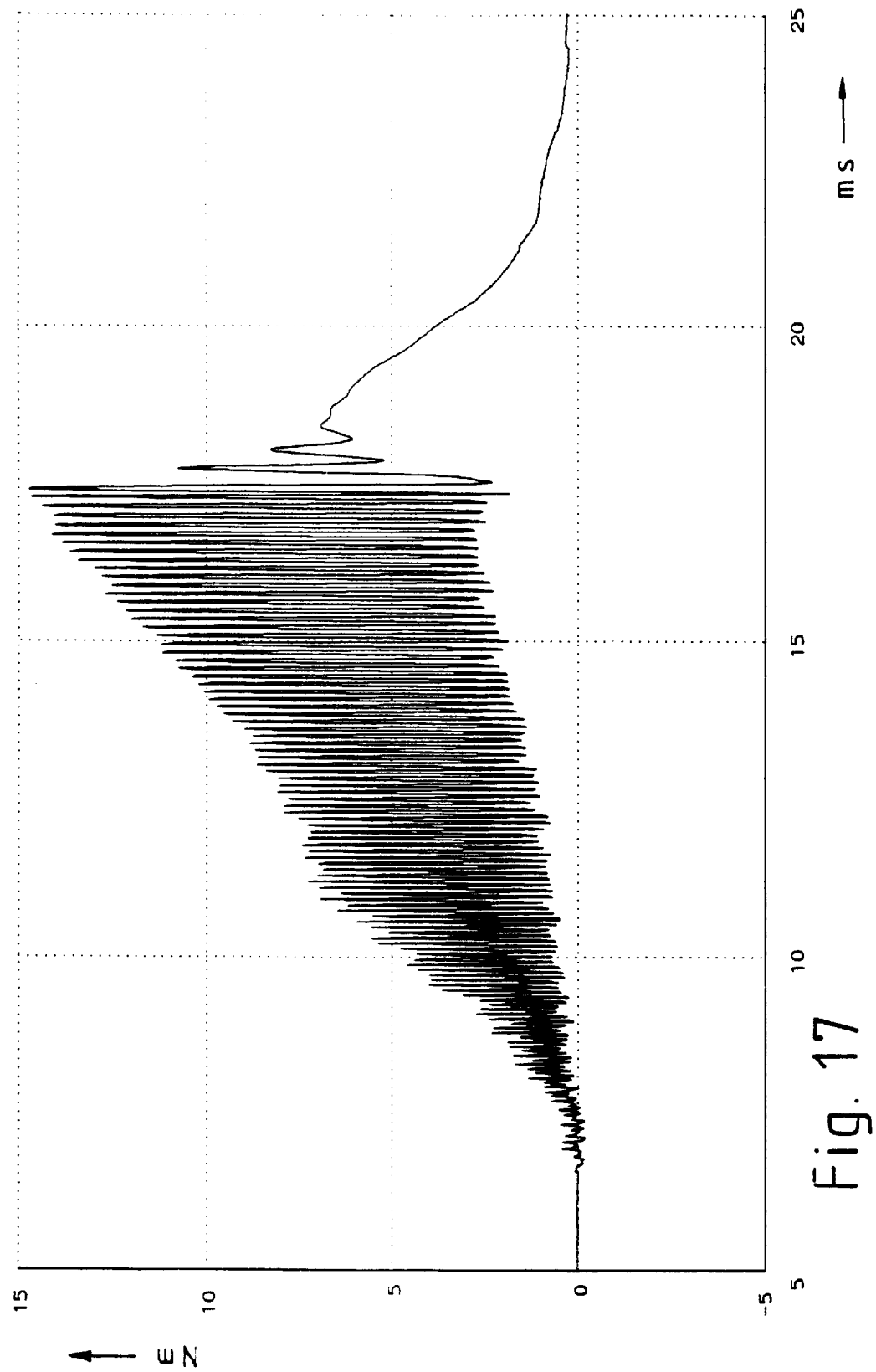
FIG. 17 shows a graphic representation of the change in torque as a function of time when tightening a screw, when a second overrunning clutch to prevent a reverse rotary motion of the tool drive shaft is rigidly supported on the housing.

FIG. 17 illustrates the change in torque (depicted in newton-meters) as a function of time (depicted in milliseconds) during tightening of a screw with a preset shutoff torque of 15 Nm. This torque profile results when the resilient support for second overrunning clutch 314 is omitted, and instead the second overrunning clutch is fastened rigidly and directly to housing 322 of power tool 300. As is evident from the oscillating torque curve, the torque rises as the screw is tightened to shutoff from the initial value of zero, even during the reverse rotation (i.e. at the lower end of the oscillation curve), to a value of approximately 3 Nm until shutting off. The resulting reaction torque to be absorbed by the user's hand at shutoff is thus approximately the average of 15 Nm and 3 Nm, and is thus on average approximately 9 Nm, before shutoff occurs and the torque falls back to zero.

Figure 18:
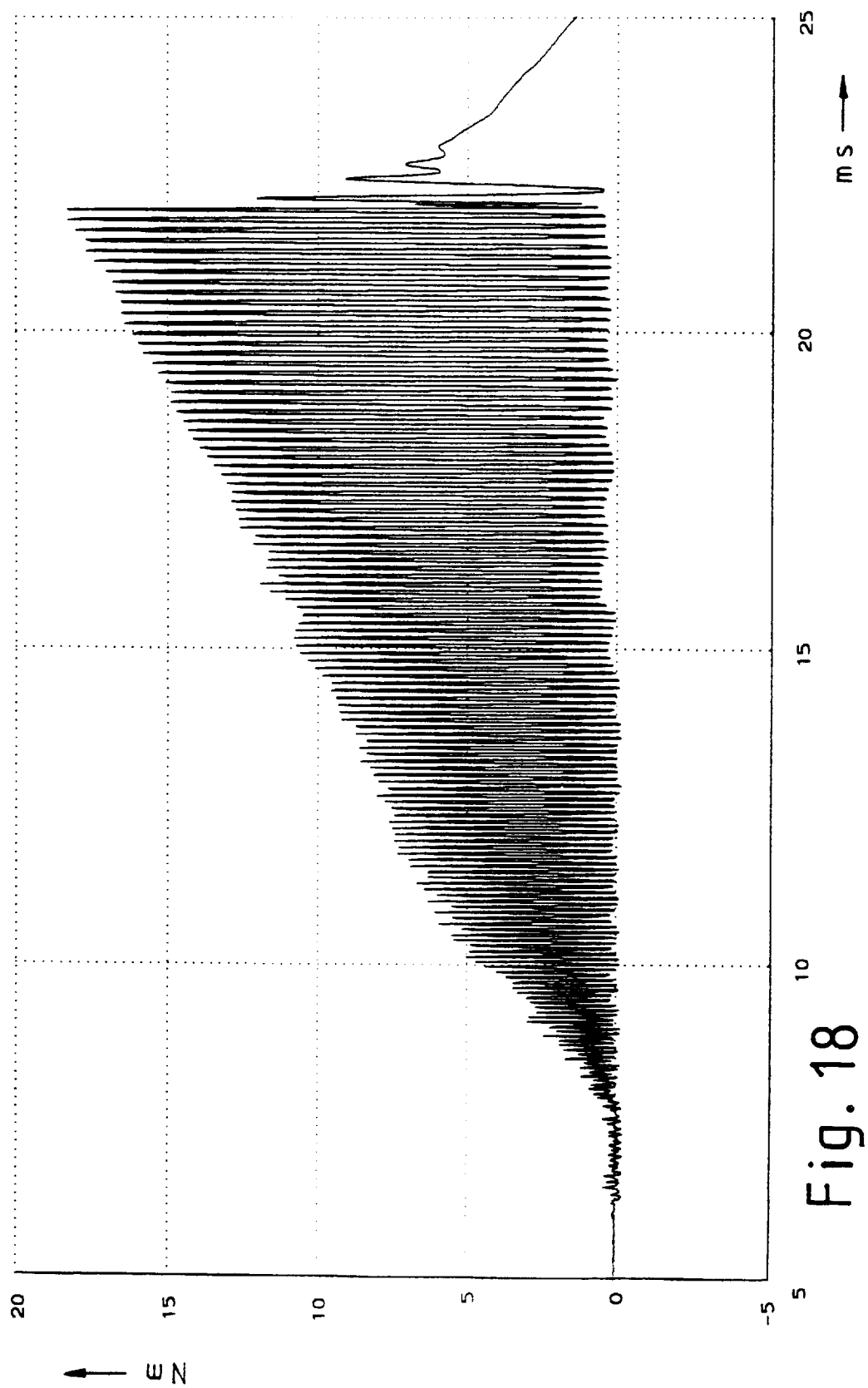
FIG. 18 shows a graphic representation of the change in torque as a function of time when tightening a screw, when the second overrunning clutch as in, for example, an embodiment according to FIG. 15 is resiliently supported.

The mode of operation with the use of, for example, a friction bearing 326 for resilient fastening of second overrunning clutch 314 to housing 322 is evident from FIG. 18.

In contrast to the gradual rise in the minimum value of the reaction torque during tightening of the threaded fastener, with the torque profile according to FIG. 18 there is no rise in the lower torque value over time. Thus with a shutoff torque of approximately 18 Nm, a reaction torque of only 9 Nm is again produced. A higher screw tightening torque can thus be achieved with the same reaction torque.

If the shutoff point is again defined as, for example, 15 Nm, the resulting reaction torque to be absorbed by the user's hand is only half of 15 Nm, i.e. 7.5 Nm.

The resilient mounting of second overrunning clutch 314 thus contributes to the fact that high torques can be transferred with a low reaction torque.

A power tool in which this principle is used, designated overall with the number 330, will now be explained in more detail below with reference to FIGS. 15 and 16.

A motor 332, which drives a coupling 358 via a linkage, is provided as drive mechanism for power tool 330. The linkage is indicated in purely schematic fashion with the number 333, since it is not located in the drawing plane of the sectional illustration.

Linkage 333 comprises an output gear 335 that is supported in rotationally movable fashion on an intermediate shaft 378. Intermediate shaft 378 is supported at the motor end by means of a thrust bearing 355, and at its other end by means of a thrust bearing 356.

The rotary motion of output gear 335 is transferred via coupling 358 to intermediate shaft 378, which is coupled, via an oscillation drive mechanism designated overall with the number 336, to an output shaft 338 whose back-and-forth oscillating motion can be converted, depending on the position of a switching element 404, either by a first overrunning clutch 342 into a clockwise rotary motion of a tool drive shaft 346, or by a third overrunning clutch 400 into a counterclockwise rotary motion.

As already explained earlier with reference to FIG. 14, once again a second overrunning clutch 344 is provided in order, in conjunction with a friction bearing 406, to prevent a reverse rotary motion of tool drive shaft 346 opposite to the working rotation direction.

Coupling 358, by means of which the rotary motion of output gear 335 is transferred to intermediate shaft 378, comprises a first coupling half 359 and a second coupling half 360 that is joined rigidly and nonrotatably to intermediate shaft 378. First coupling half 359 is freely rotatable on intermediate shaft 378, and is braced against thrust bearing 355.

First coupling half 359 comprises output gear 335 and a plurality of cylindrical rollers 362 that are held between radial lands 361 on output gear 335. Second coupling half 360 comprises a cage 364 inside which are held, in corresponding pockets, balls 363 that are pushed by a spring element 370 configured as a cup spring packet, via a thrust washer 365, toward first coupling half 359. According to the position drawn in the top half of intermediate shaft 378, rollers 362 engage in the gaps formed between balls 363, thus resulting, by means of an overlap (designated with S) between rollers 362 and balls 363, in a positive torque transfer from first coupling half 359 to second coupling half 360. This is the engagement position, in which the drive motion of gear 335 is positively transferred to second coupling half 360 and thus to intermediate shaft 378, since second coupling half 360 is rigidly and nonrotatably joined, with its cage 364, to intermediate shaft 378.

If the torque to be transferred by coupling 358 then increases so much that the preload of the cup spring packet is exceeded, balls 363 with thrust washer 365 thus move to the right and compress the cup spring packet, as shown in the bottom half, so that rollers 362 of first coupling half 359 move out of the gaps formed between balls 363, and torque transfer is interrupted.

The displacement of thrust washer 365 is transferred via a follower 366 to a sensor that acts on a switch 368, indicated only schematically, by which motor 332 is shut off.

The result is a reliable and noiseless shutoff when a predefined torque is reached.

In order to allow adjustment of the shutoff torque at which a shutoff of motor 332 occurs, the overlap S between balls 363 and rollers 362 can be changed by means of an adjustment device, arranged at the outer end of intermediate shaft 378, that is designated overall with the number 380. The greater the overlap S that must be overcome by compression of the cup spring packet, the greater also is the spring force to be overcome, and thus the shutoff torque of coupling 358.

Adjustment device 380 is merely indicated in FIG. 15 for the sake of clarity, while the more detailed design of adjustment device 380 is evident from FIG. 16, which also comprises the elements of adjustment device 380 not present in the drawing plane of FIG. 15.

Adjustment device 380 comprises, according to FIG. 16, a first rocker ring 383 and a second rocker ring 384, which are each joined to an external toothed ring 385 and 386 respectively.

Rocker rings 383, 384 are mutually braced against one another. Intermediate shaft 378 is supported in the axial direction, via thrust bearing 356, against first rocker ring 383.

Since the two rocker rings 383, 384 have one rocker cam each, which rise in the axial direction and slide on one another, the axial distance between intermediate shaft 378 and the wall of housing 352 can be modified by a rotation of the two rocker rings 383, 384 relative to one another. The overlap S between balls 363 and rollers 362 can thereby be modified.

First rocker ring 383 can be fixed in a desired rotation position with the aid of an adjustment screw 387 via a gear 388 with self-locking teeth.

Second rocker ring 384, on the other hand, against which first rocker ring 383 is braced, can be rotated from outside by means of a gear 389 via an adjusting knob 390. While adjustment screw 387 is used for basic adjustment of the release torque of coupling 358, adjustment knob 390 can be equipped with a torque scale for the torque at which a release of coupling 358 and thus a shutoff of motor 332 occurs.

Also provided on intermediate shaft 378 is an eccentric 374 that is nonrotatably joined to intermediate shaft 378 and is braced against thrust bearing 356. Eccentric 374 is surrounded by an oscillating fork 376, indicated only schematically, the other end of which, as output shaft 338, is supported in rotationally movable fashion on tool drive shaft 346. When intermediate shaft 378 rotates, an oscillating motion about the longitudinal axis is thus imparted to oscillating fork 376 of oscillation drive mechanism 336. To compensate for the imbalance caused by eccentric 374, a balancing ring 354 is provided on intermediate shaft 378 between spring element 370 and eccentric 374.

Output shaft 338 is equipped at both axial ends with engagement elements 394 and 397, which are configured as claws.

Corresponding engagement elements 393, matched in terms of shape and size, are provided at the end surface of first overrunning coupling 342 which faces output shaft 338, thus constituting between engagement elements 393 of first overrunning clutch 342 and engagement elements 394 of output shaft 338 a disconnect coupling 392 which, depending on the axial position of first overrunning clutch 342 with respect to output shaft 338, makes possible positive engagement or free rotation of output shaft 338 with respect to first overrunning clutch 342.

A second disconnect coupling 396, which also makes possible positive power transfer, is constituted by engagements elements 397 on output shaft 338 and corresponding engagement elements 398 on third overrunning clutch 400. In the illustrated position, engagement elements 397, 398 are in engagement, so that a power transfer from output shaft 338 to overrunning clutch 400 occurs (left-hand rotation engaged). In this position, therefore, tool drive shaft 346 is intermittently driven counterclockwise by output shaft 338, oscillating back-and-forth, via third overrunning clutch 400. Thus, for example, a threaded connection can be undone with a tool inserted into tool receptacle 348.

As already mentioned earlier, second overrunning clutch 344, which is fastened directly to housing 352 via a friction bearing 406, is located at the end of tool drive shaft 346 opposite to tool receptacle 348. If tool drive shaft 346 then moves counterclockwise (left-hand rotation), second overrunning clutch 344 thus locks. But since the latter is resiliently fastened to housing 352 via friction bearing 406, second overrunning clutch 344 rotates in friction bearing 406, so as thereby to allow left-hand rotation.

A switching element 404 that is fastened via an eccentric 405 to housing 352, and by means of a pin 403 displaces first overrunning clutch 342 in the axial direction when switching element 404 rotates, is provided in order to switch between right-hand and left-hand rotation. In order also to displace third overrunning clutch 400 simultaneously by the same amount, the two overrunning clutches 342, 400 are coupled by a bracket 401 that engages via pins 402 and 403 into corresponding grooves 340 and 382 on first overrunning clutch 342 and third overrunning clutch 400, respectively.

It is thus possible, by rotating switching element 404, to displace first overrunning clutch 342 and third overrunning clutch 400 together in the axial direction, so as either to close first disconnect coupling 392 or to close second disconnect coupling 396.

If switching element 404 is then rotated in such a way that first disconnect coupling 392 is closed and second disconnect coupling 396 is opened, the machine is thus switched over from left-hand to right-hand rotation. An oscillating rotary motion of output shaft 338 is thereby converted into an intermittent clockwise rotary motion of tool drive shaft 346. A reverse rotation of tool drive shaft 346 in the counterclockwise direction is largely damped by second overrunning clutch 344 in conjunction with friction bearing 406.

A limitation of the reaction torque exerted on a user's hand is hereby achieved by means of the resilient mounting of second overrunning clutch 344 on housing 352 via friction bearing 406, as was explained previously with reference to FIG. 18.

We claim:

1. A power tool comprising
    a housing;
    a drive mechanism with an output shaft having a longitudinal axis, said output shaft performing a rotary motion oscillating back and forth about its longitudinal axis;
    a tool drive shaft for driving a tool;
    at least a first overrunning clutch having an engagement direction for transmitting torque and an idle direction, said first overrunning clutch being coupled to the output shaft and to the tool drive shaft for converting the oscillating rotary motion of the output shaft into an intermittent rotary motion of the tool drive shaft in one working rotation direction; and
    a damping device engaging the tool drive shaft and the housing for damping a reverse rotation of the tool drive shaft opposite to the working rotation direction.

2. The power tool as defined in claim 1, in which the damping device comprises a second overrunning clutch which prevents a reverse rotation of the tool drive shaft opposite to the working rotation direction.

3. The power tool as defined in claim 2, in which the second overrunning clutch has an engagement direction for transmitting torque and an idle direction, said engagement direction being opposite to the engagement direction of the first overrunning clutch.

4. The power tool as defined in claim 3, in which the second overrunning clutch is fastened resiliently to the housing.

5. The power tool as defined in claim 4, in which the second overrunning clutch is fastened to the housing in a friction bearing.

6. The power tool as defined in claim 1, in which the drive mechanism comprises a motor that is coupled to an oscillation drive mechanism which converts a rotary motion of the motor into a back-and-forth oscillating rotary motion of the output shaft.

7. The power tool as defined in claim 1, further comprising means for interrupting a torque transfer from the output shaft to the tool drive shaft when a predefined torque is reached.

8. The power tool as defined in claim 7, in which an adjustment device, for presetting the torque at which the interruption of the torque transfer occurs, is provided.

9. The power tool as defined in claim 7, in which the means for interrupting the torque transfer comprise a switch for shutting off the drive mechanism.

10. The power tool as defined in claim 7, in which the means for interrupting the torque transfer comprise a coupling that, in order to interrupt the torque transfer, releases when the predefined torque is reached.

11. The power tool as defined in claim 10, in which the coupling is coupled to a switch in order to shut off the drive mechanism when the coupling releases.

12. The power tool as defined in claim 10, in which the coupling comprises two coupling halves, at least one of which is movable in the axial direction against the force of a spring element, an adjustment device being provided to preset the spring tension.

13. The power tool as defined in claim 12, in which one of the two coupling halves comprises a plurality of balls in a holder, and in which the other coupling half comprises a plurality of rollers in a holder that engage into gaps between the balls in order to allow positive torque transfer.

14. The power tool as defined in claim 13, in which the coupling half which is movable in the axial direction is joined to an intermediate shaft, said coupling half being displaceable in the axial direction by means of the adjustment device, in order to set the shutoff torque of the coupling.

15. The power tool as defined in claim 1, further comprising a motor having a motor shaft driving an eccentric element engaging a pivot element that is nonrotatably joined to the output shaft.

16. The power tool as defined in claim 1, which further comprises a device for reversing the rotation direction of the tool drive shaft.

17. The power tool as defined in claim 16, wherein said damping device comprises a further overrunning clutch, said first overrunning clutch engaging clockwise and said further overrunning clutch engaging counterclockwise, both overrunning clutches coupled to the tool drive shaft; and wherein a switching element is provided by means of which the tool drive shaft can be coupled alternatively to the first or to the further overrunning clutch, in order to drive the tool drive shaft either clockwise or counterclockwise.

18. The power tool as defined in claim 17, in which the output shaft is arranged between the first and the further overrunning clutch, the output shaft having two ends, both comprising engagement elements with which are associated respective corresponding coupling elements on the first and on the further overrunning clutch, thereby providing a first disconnect coupling between the output shaft and the first overrunning clutch, and a second disconnect coupling between the output shaft and the other overrunning clutch; the switching element being configured to shift the first and the further overrunning clutch together in the axial direction so as alternatively to close the first disconnect coupling in order to drive the tool drive shaft clockwise, or the second disconnect coupling in order to drive the tool drive shaft counterclockwise.

19. The power tool as defined in claim 1, in which the output shaft is held by two bearings arranged at a spacing from one another, the one bearing being immobilized in the radial direction of the output shaft, while the other bearing is arranged displaceably in the radial direction against a preload; and a sensor element being associated with the output shaft to shut off the drive mechanism when a radial displacement occurs.

20. The power tool as defined in claim 19, in which the other bearing is received by a plain guide which allows a displacement of the output shaft in the radial direction.

21. The power tool as defined in claim 1, which is embodied as a power drill.

22. The power tool as defined in claim 1, which is embodied as a power sander.

23. The power tool as defined in claim 1, which is embodied as a saw.

24. The power tool as defined in claim 1, which is embodied as a sheet-metal cutter.

25. A power tool comprising
    a housing;
    a motor;

an oscillation drive mechanism, driven by the motor, in order to convert a rotary motion of the motor into a back-and-forth oscillating rotary motion of an output shaft;

a tool drive shaft for driving a tool;

a first overrunning clutch having an engagement direction for transmitting torque and an idle direction, said first overrunning clutch being provided between the output shaft and the tool drive shaft for converting the oscillating rotary motion of the output shaft into an intermittent rotary motion of the tool drive shaft in one working rotation direction;

a a second overrunning clutch provided between the tool drive shaft and the housing for preventing a reverse rotation of the tool drive shaft opposite to the working rotation direction;

a third overrunning clutch, having an engagement direction for transmitting torque and an idle direction and being provided between the output shaft and the tool drive shaft, said third overrunning clutch having an engagement direction which is opposite to the engagement direction of said first overrunning clutch; and a switching element for coupling the output shaft alternatively to the first or the third overrunning clutch in order to drive the tool drive shaft either clockwise or counterclockwise.

26. The power tool as defined in claim 25, in which the second overrunning clutch is coupled to a housing of the power tool and to the tool drive shaft, and has a counterclockwise engaging direction for transmitting torque, and an idle direction.

27. The power tool as defined in claim 26, in which the second overrunning clutch is fastened resiliently to the housing.

28. The power tool as defined in claim 27, in which the second overrunning clutch is fastened to the housing in a friction bearing.

29. The power tool as defined in claim 27, further comprising means for interrupting a torque transfer from the output shaft to the tool drive shaft when a predefined torque is reached.

30. The power tool as defined in claim 29, in which an adjustment device, for presetting the torque at which the interruption of torque transfer occurs, is provided.

31. The power tool as defined in claim 30, in which the means for interrupting the torque transfer comprise a switch for shutting off the drive mechanism.

32. The power tool as defined in claim 31, in which the means for interrupting the torque transfer comprise a coupling that, in order to interrupt the torque transfer, releases when the predefined torque is reached.

33. The power tool as defined in claim 32, in which the coupling is coupled to the switch in order to shut off the drive mechanism when the coupling releases.

34. The power tool as defined in claim 25, in which the oscillation drive mechanism comprises an eccentric element, drive by a motor shaft of the motor, by which a pivot element that is nonrotatably joined to the output shaft is driven.

35. A power tool comprising:

an oscillating rotary motion output shaft;

a tool drive shaft for driving a tool;

a first overrunning clutch having an engagement direction and an idle direction, said first overrunning clutch for converting the oscillating rotary motion of the output shaft into an intermittent rotary motion of the tool drive shaft in one working rotation direction; and a damping device for damping a reverse rotation of the tool drive shaft opposite the working rotation direction.

36. The power tool as defined in claim 35, in which the damping device comprises a second overrunning clutch coupled to a housing of the power tool and to the tool drive shaft, the second overrunning clutch having an engaging direction, opposite the engaging direction of the first overrunning clutch, for transmitting torque and an idle direction.

* * * * *

UNITED STATES PATENT AND TRADEMARK OFFICE
CERTIFICATE OF CORRECTION

PATENT NO. : 5,868,208
DATED : February 9, 1999
INVENTOR(S) : Peirsert et al.

It is certified that error appears in the above-identified patent and that said Letters Patent is hereby corrected as shown below:

On the title page, insert the following:

-- [73] Assignee: C. & E. FEIN GmbH & Co., Stuttgart, Germany --

Signed and Sealed this

Twenty-eighth Day of September, 1999

Attest:

Q. TODD DICKINSON

*Attesting Officer*     *Acting Commissioner of Patents and Trademarks*